(12) United States Patent
Basich et al.

(10) Patent No.: US 11,307,585 B2
(45) Date of Patent: Apr. 19, 2022

(54) INTROSPECTIVE COMPETENCE MODELING FOR AV DECISION MAKING

(71) Applicants: Nissan North America, Inc., Franklin, TN (US); The University of Massachusetts, Boston, MA (US); Renault S.A.S., Boulogne-Billancourt (FR)

(72) Inventors: Connor Basich, Northampton, MA (US); Kyle Hollins Wray, Fremont, CA (US); Stefan Witwicki, San Carlos, CA (US); Shlomo Zilberstein, Amherst, MA (US)

(73) Assignees: Nissan North America, Inc., Franklin, TN (US); The University of Massachusetts, Boston, MA (US); Renault S.A.S., Boulogne-Billancourt (FR)

( * ) Notice: Subject to any disclaimer, the term of this patent is extended or adjusted under 35 U.S.C. 154(b) by 238 days.

(21) Appl. No.: 16/668,584

(22) Filed: Oct. 30, 2019

(65) Prior Publication Data
US 2021/0132606 A1 May 6, 2021

(51) Int. Cl.
*G05D 1/00* (2006.01)
(52) U.S. Cl.
CPC ......... *G05D 1/0088* (2013.01); *G05D 1/0061* (2013.01); *G05D 2201/0213* (2013.01)
(58) Field of Classification Search
CPC ......... G05D 1/0088; G05D 2201/0213; G05D 1/0027; G06N 20/00; G06N 3/004; G06N 3/02; G06N 20/20; G06N 3/006; G06N 3/04; G06N 3/086; G06N 5/025; G05B 13/02; H04L 41/00
USPC ........ 701/23; 700/275; 706/14, 47; 709/223; 600/300
See application file for complete search history.

(56) References Cited

U.S. PATENT DOCUMENTS

| | | | |
|---|---|---|---|
| 7,668,613 B2* | 2/2010 | Baier | G05B 19/41865 700/96 |
| 8,838,417 B2* | 9/2014 | Rikkola | G06K 9/0014 702/188 |
| 2006/0184292 A1* | 8/2006 | Appleby | F41H 13/00 701/23 |
| 2007/0033273 A1* | 2/2007 | White | G06F 8/30 709/223 |
| 2007/0034215 A1* | 2/2007 | Hinchey | G06N 3/086 600/300 |

(Continued)

*Primary Examiner* — Alexander G Kalinowski
*Assistant Examiner* — Sanjeev Malhotra
(74) *Attorney, Agent, or Firm* — Young Basile Hanlon & MacFarlane, P.C.

(57) ABSTRACT

A first method includes detecting, based on sensor data, an environment state; selecting an action based on the environment state; determining an autonomy level associated with the environment state and the action; and performing the action according to the autonomy level. The autonomy level can be selected based at least on an autonomy model and a feedback model. A second method includes calculating, by solving an extended Stochastic Shortest Path (SSP) problem, a policy for solving a task. The policy can map environment states and autonomy levels to actions and autonomy levels. Calculating the policy can include generating plans that operate across multiple levels of autonomy.

20 Claims, 8 Drawing Sheets

(56) References Cited

U.S. PATENT DOCUMENTS

| | | | | |
|---|---|---|---|---|
| 2007/0073631 A1* | 3/2007 | Hinchey | ................... | G06N 3/04 |
| | | | | 706/14 |
| 2012/0041913 A1* | 2/2012 | Hinchey | .............. | G06N 3/0436 |
| | | | | 706/14 |
| 2013/0080360 A1* | 3/2013 | Sterritt | ................... | G06N 3/004 |
| | | | | 706/14 |
| 2013/0080361 A1* | 3/2013 | Sterritt | ................... | G05B 13/02 |
| | | | | 706/14 |
| 2013/0185407 A1* | 7/2013 | Kaminsky | ................ | G06N 5/02 |
| | | | | 709/223 |
| 2015/0363701 A1* | 12/2015 | Lin | ........................ | G05B 15/02 |
| | | | | 700/275 |
| 2016/0078342 A1* | 3/2016 | Tang | ....................... | H04L 41/00 |
| | | | | 706/47 |
| 2019/0138004 A1* | 5/2019 | Palanisamy | ........... | G05D 1/0088 |
| 2019/0377342 A1* | 12/2019 | Panzica | ..................... | G08G 1/20 |
| 2020/0035337 A1* | 1/2020 | Sohne | ................... | G08B 21/182 |
| 2020/0045069 A1* | 2/2020 | Nanda | ..................... | G06N 7/005 |
| 2020/0133307 A1* | 4/2020 | Kelkar | ..................... | G08G 1/22 |
| 2020/0272949 A1* | 8/2020 | Chen | ..................... | H04W 4/025 |

* cited by examiner

INTROSPECTIVE COMPETENCE MODELING FOR AV DECISION MAKING

TECHNICAL FIELD

This disclosure relates generally to autonomous vehicle operational management and autonomous driving, and more particularly to determining a level of operational autonomy of an autonomous vehicle according to a competence model.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. On occasion, an occlusion makes some data is unavailable.

SUMMARY

A first aspect of the disclosed embodiments is a method of autonomous driving by an autonomous vehicle (AV). The method includes detecting, based on sensor data, an environment state; selecting an action based on the environment state; determining an autonomy level associated with the environment state and the action; and performing the action according to the autonomy level. The autonomy level can be selected based at least on an autonomy model and a feedback model.

A second aspect of the disclosed embodiments is a system for autonomous including a memory and a processor. The processor is configured to execute instructions stored in the memory to calculate, by solving an extended Stochastic Shortest Path (SSP) problem, a policy for solving a task. The policy can map environment states and autonomy levels to actions and autonomy levels. To calculate the policy can include to generate plans that operate across multiple levels of autonomy.

A third aspect of the disclosed embodiments is a method for autonomous driving. The method includes calculating, by solving an extended Stochastic Shortest Path (SSP) problem, a policy for solving a task. The policy can map environment states and autonomy levels to actions and autonomy levels. Calculating the policy can include generating plans that operate across multiple levels of autonomy.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
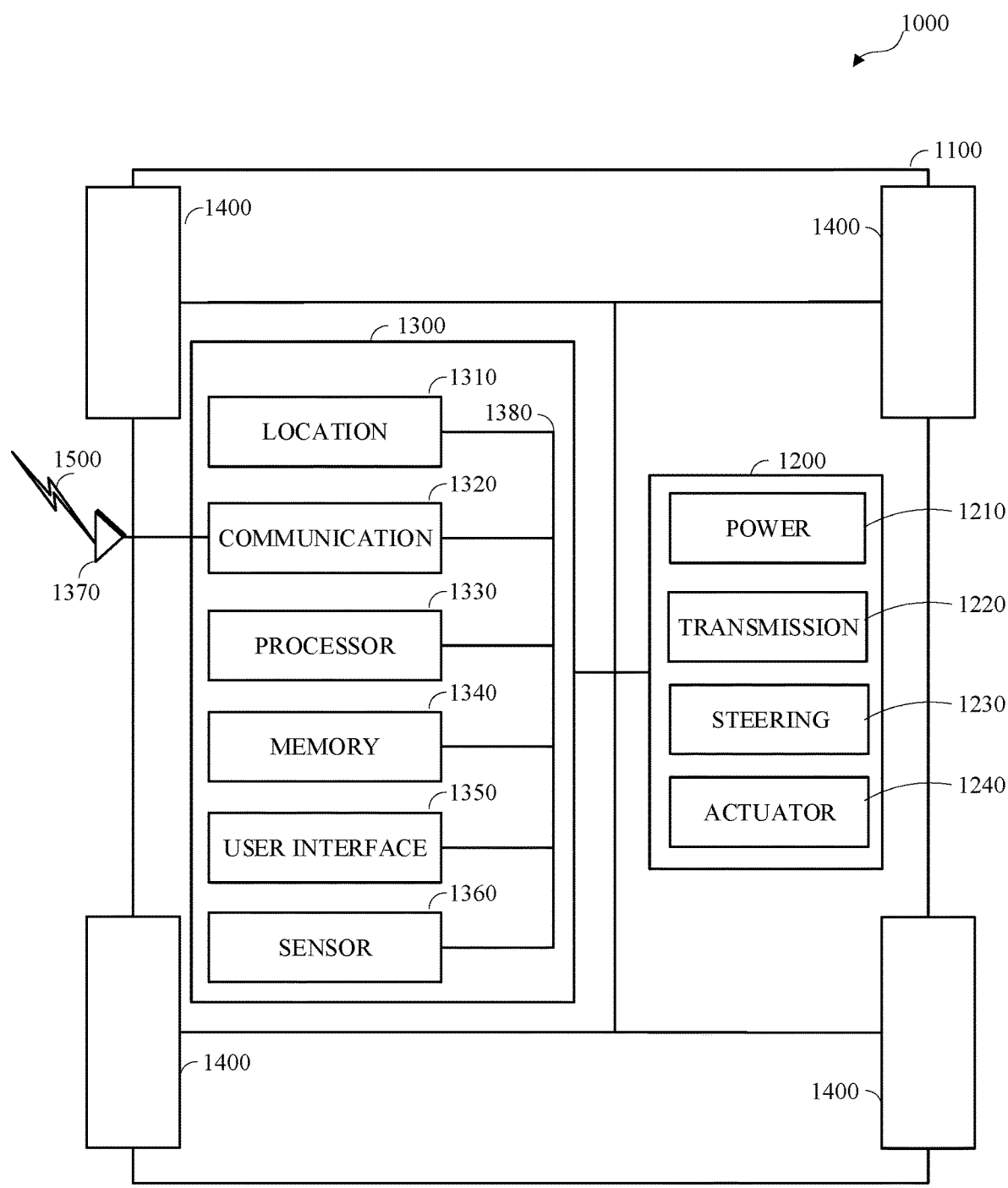
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle.

The autonomous vehicle operational management system may include an autonomous vehicle operational management controller, which may detect one or more operational scenarios, such as pedestrian scenarios, intersection scenarios, lane change scenarios, or any other vehicle operational scenario or combination of vehicle operational scenarios, corresponding to the external objects. An operational scenario or a set related to operational scenarios may be referred herein as environment state.

The autonomous vehicle operational management system may include one or more scenario-specific operational control evaluation modules (SSOCEMs). Each scenario-specific operational control evaluation module may be a model, such as a Partially Observable Markov Decision Process (POMDP) model, of a respective operational scenario. That is, each model is configured to handle a specific scenario. The autonomous vehicle operational management controller may instantiate respective instances of the scenario-specific operational control evaluation modules in response to detecting the corresponding operational scenarios.

The autonomous vehicle operational management controller may receive candidate vehicle control actions from respective instantiated scenario-specific operational control evaluation module (SSOCEM) instances, may identify a vehicle control action from the candidate vehicle control actions, and may control the autonomous vehicle to traverse a portion of the vehicle transportation network according to the identified vehicle control action.

In some implementations, an SSOCEM may be configured to autonomously complete some tasks while requiring the intervention of a human to complete other tasks. That is, an SSOCEM can operate autonomously under certain conditions, but may require human intervention or aid in order to achieve its goal (e.g., crossing an intersection). As such, the SSOCEM can be in one of two binary autonomous states or levels.

For example, in response to detecting an obstacle on the road (i.e., on a portion of a vehicle transportation network), an SSOCEM may issue a request for assistance to a tele-operator. The tele-operator can be a human operator that is responsible for remotely monitoring and assisting one or more autonomous vehicles. The tele-operator can cause sensor data (e.g., camera images and/or video) to be streamed to the tele-operator so that the tele-operator can gain situational awareness and plot a navigation path for the AV around the obstacle and/or remotely control the actions of the AV.

In another example, a lane-traversal SSOCEM may use lane markers to maintain an AV within a lane. In some situations, the lane-traversal SSOCEM may no longer be able to demarcate the lane boundaries, such as in a case where the sensors may be dirty or have malfunctioned or the lane markers are covered with snow or mud. In such situations, the lane-traversal SSOCEM may request that a human (e.g., a driver occupant of the AV or a tele-operator) assume control of the AV.

Reliance on human assistance (i.e., intervention) can be indicative of the limited competence of the SSOCEM in its autonomy model. Human intervention can be costly. For example, it may take a relatively long period of time for a tele-operator to respond to a request for assistance from an AV. In the meanwhile, the AV may be obstructing traffic. For example, as the number of tele-operator requests for assistance from AV increases, the number of available tele-operators needs to necessarily increase.

In implementations according to this disclosure, an SSOCEM can be, or can include, an autonomy cognizant agent (ACA) that selects a next action to perform and an autonomy level for performing the action in based on an autonomy model that the ACA maintains and evolves. For example, initially, the autonomy model can indicate that the ACA is to seek human assistance (e.g., feedback) for an action given a detected environment state. As the ACA receives more and more feedback, such as from the human, the ACA can become less and less reliant on the human assistance becomes the ACA learns when it is appropriate to perform an action under lesser levels of assistance, which means higher of autonomy (i.e., competence). As such, the ACA can be said to be, or thought of as being, aware of its level of competence.

In implementations according to this disclosure, an ACA can consider all levels of autonomy available to it during plan generation (as opposed to, for example, adjusting the level of autonomy during plan execution). As such, the ACA can create plans that more effectively utilize the ACA's knowledge of its own levels of autonomy.

Additionally, in implementations according to this disclosure, the ACA can model multiple forms of human feedback, thereby enabling the ACA to proactively plan in a manner that also considers the likelihood of each form of human feedback. As such, the ACA can preemptively avoid situations where negative feedback is likely.

Furthermore, the ACA can maintain a predictive model of the human feedback and intervention through experience enabling the ACA to diminish the reliance of the ACA on humans over time by avoiding situations which are more likely to require human intervention as well as well as adjust the levels of autonomy of the ACA over time. As such, the ACA can perform at the least-cost level of autonomy for any situation (i.e., environment state) that the ACA encounters (i.e., detects based on sensor data).

The ACA can then use the autonomy model in to traverse the vehicle transportation network.

FIG. 1 is a diagram of an example of a vehicle in which the aspects, features, and elements disclosed herein may be implemented. In the embodiment shown, a vehicle 1000 includes various vehicle systems. The vehicle systems include a chassis 1100, a powertrain 1200, a controller 1300, and wheels 1400. Additional or different combinations of vehicle systems may be used. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, transmits the energy to the wheels 1400 to provide a motive force. The transmission 1220 may be controlled by the controller 1300, the actuator 1240, or both. The steering unit 1230 may be controlled by the controller 1300, the actuator 1240, or both and control the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 1000.

The sensors 1360 include one or more sensors 1360 that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
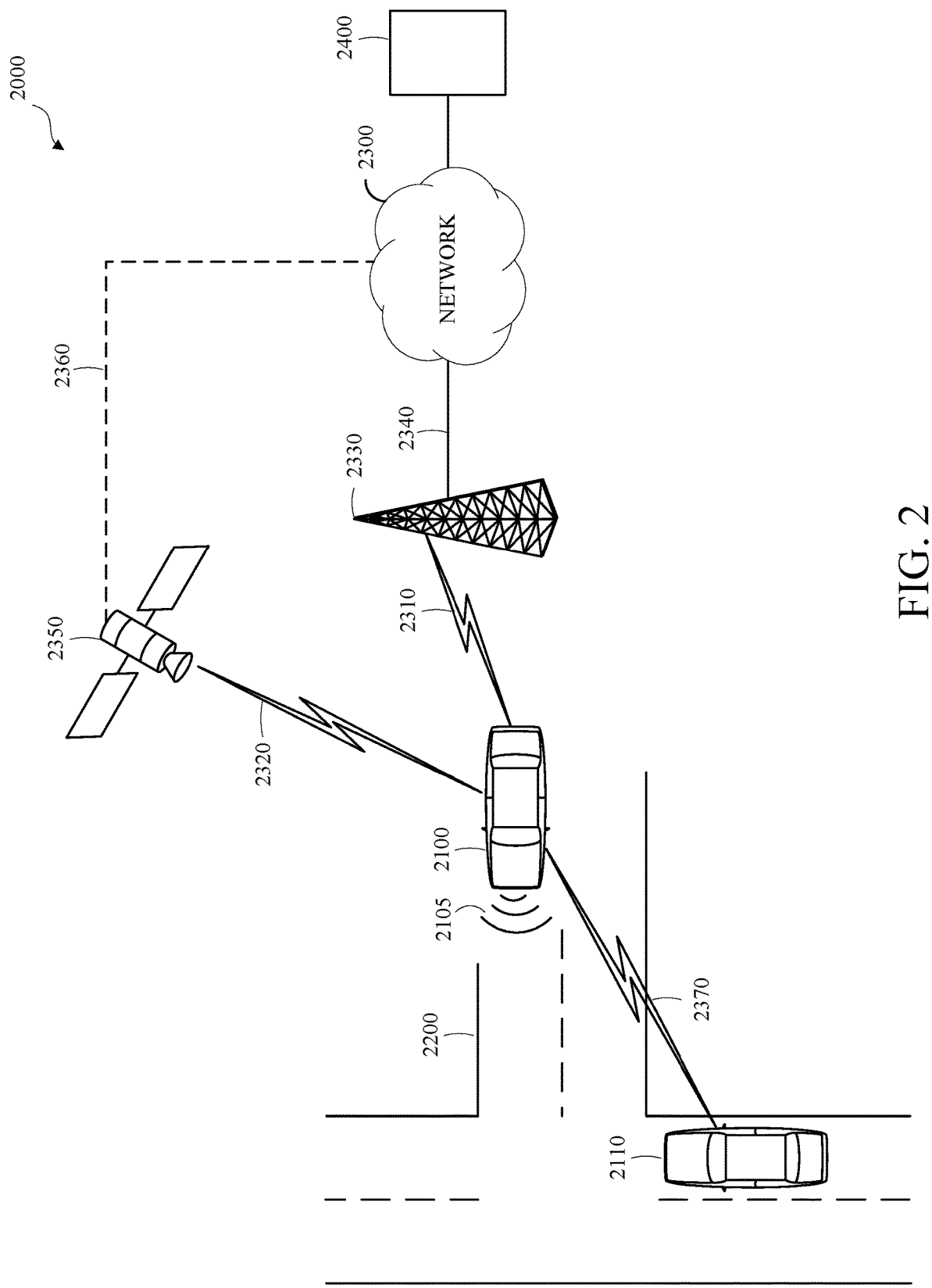
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensor 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
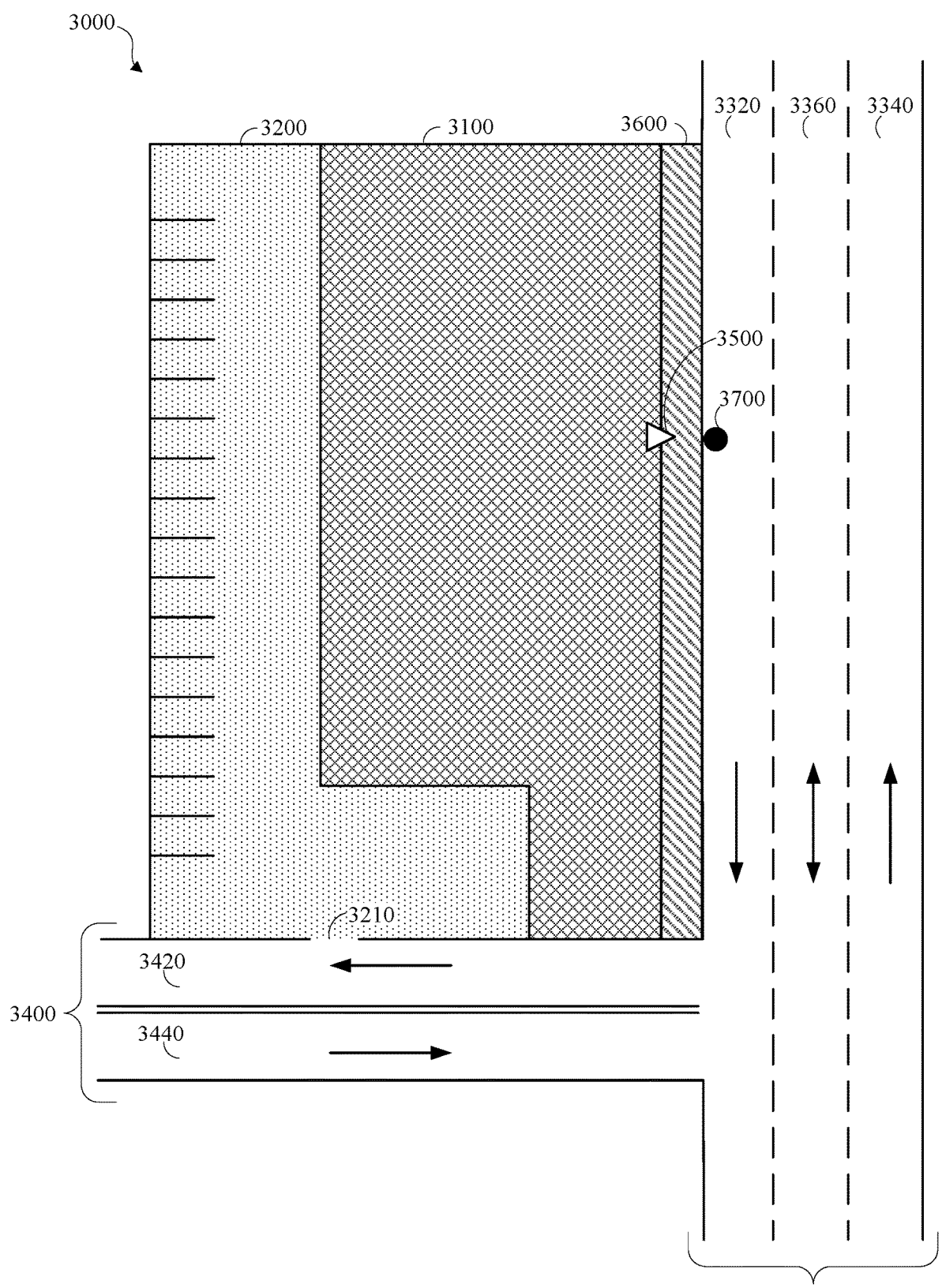
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, a number of lanes, known hazards, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian walkway or crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3. A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed.

Figure 4:
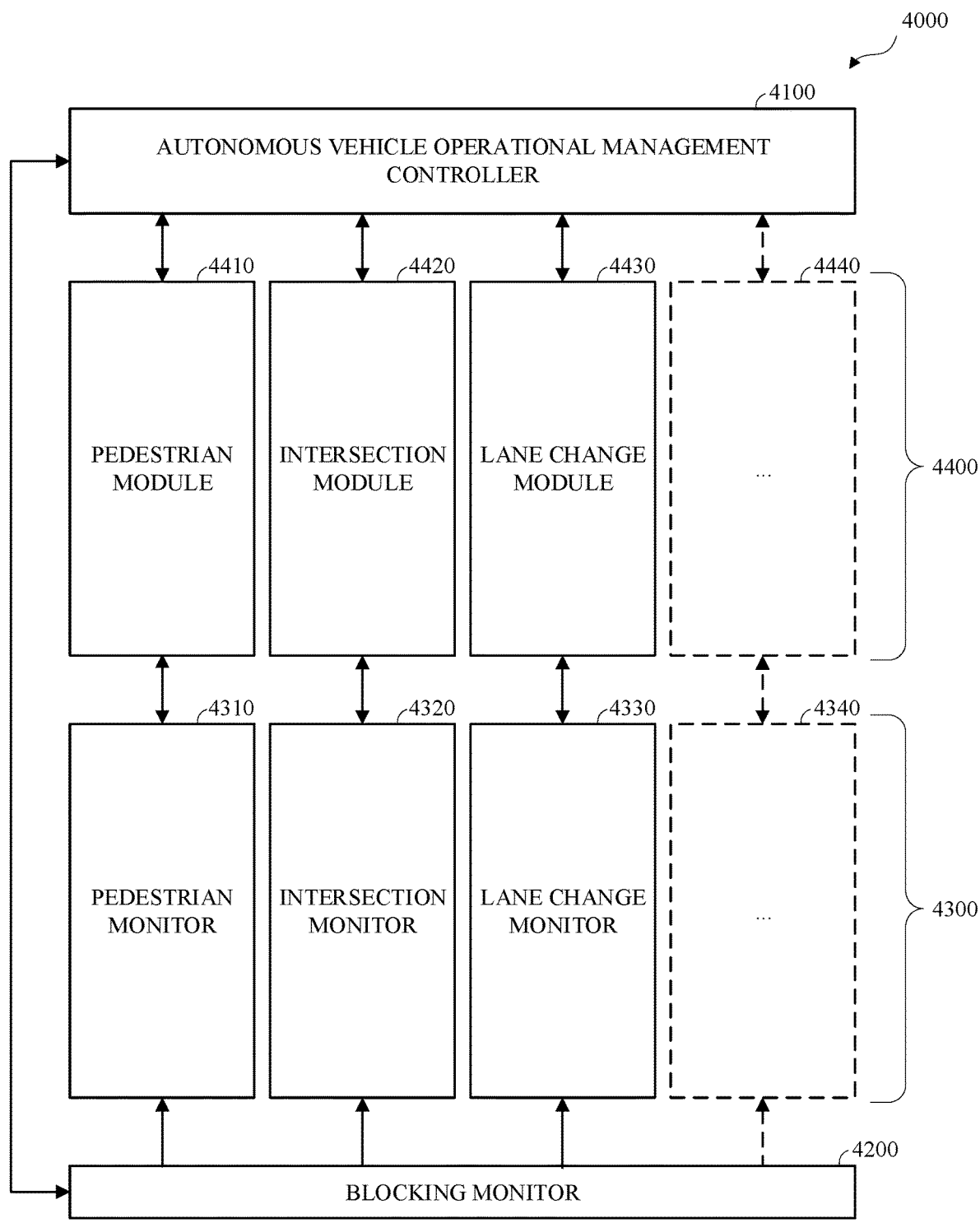
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario (also called a scenario herein) may include any distinctly identifiable set of operative conditions that may affect the operation of the autonomous vehicle within a defined spatiotemporal area, or operational environment, of the autonomous vehicle. A distinct vehicle operational scenario may be based on a number or cardinality of roads, road segments, or lanes that the autonomous vehicle may traverse within a defined spatiotemporal distance. A distinct vehicle operational scenario may be based on one or more traffic control devices that may affect the operation of the autonomous vehicle within a defined spatiotemporal area, or operational environment, of the autonomous vehicle. A distinct vehicle operational scenario may be based on one or more identifiable rules, regulations, or laws that may affect the operation of the autonomous vehicle within a defined spatiotemporal area, or operational environment, of the autonomous vehicle. A distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios include a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes. A distinct vehicle operational scenario may separately include merging lanes, or the distinct vehicle operational scenario wherein the autonomous vehicle is changing lanes may also include merging lanes.

For simplicity and clarity, similar vehicle operational scenarios may be described herein with reference to vehicle operational scenario types or classes. A type or class of a vehicle operational scenario may refer to a particular pattern or set of patters on the scenario. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, edging, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action. Examples of vehicle control actions include a 'stop' vehicle control action that stops or otherwise controls the autonomous vehicle to become or remain stationary, an 'advance' vehicle control action that moves the autonomous vehicle forward slowly for a short distance, such as a few inches or a foot, an 'accelerate' vehicle control action that accelerates the autonomous vehicle (e.g., at a defined acceleration rate or within a defined range), a 'decelerate' vehicle control action that decelerates the autonomous vehicle (e.g., at a defined deceleration rate or within a defined range), a 'maintain' vehicle control action that maintains the current operational parameters (e.g., a current velocity, a current path or route, a current lane orientation, etc.), a 'turn' vehicle control action (which may include an angle of a turn), a 'proceed' vehicle control action that begins or resumes a previously identified set of operational parameters, or any other standard vehicle operation.

A vehicle control action may be a compound vehicle control action, which may include a sequence, combination, or both of vehicle control actions. For example, an 'advance' or 'edge' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include the autonomous vehicle operational management controller 4100, a blocking monitor 4200, operational environment monitors 4300, SSOCEMs 4400, or a combination thereof. Although described separately, the blocking monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the vehicle within a defined spatiotemporal area of the vehicle.

The operational environment information may include vehicle information for the autonomous vehicle, such as information indicating a geospatial location of the vehicle, information correlating the geospatial location to information representing the vehicle transportation network, a route of the vehicle, a speed of the vehicle, an acceleration state of the vehicle, passenger information of the vehicle, or any other information about the vehicle or the operation of the vehicle.

The operational environment information may include information representing the vehicle transportation network proximate to the autonomous vehicle, such as within a defined spatial distance (e.g., 300 meters) of the vehicle, information indicating the geometry of one or more aspects of the vehicle transportation network, information indicating a condition, such as a surface condition, of the vehicle transportation network, or any combination thereof.

The operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the vehicle.

The autonomous vehicle operational management controller 4100 may monitor the operational environment of the autonomous vehicle, or defined aspects thereof. Monitoring the operational environment may include identifying and tracking external objects, identifying distinct vehicle operational scenarios, or a combination thereof.

For example, the autonomous vehicle operational management controller 4100 may identify and track external objects with the operational environment of the autonomous vehicle. Identifying and tracking the external objects may include identifying spatiotemporal locations of respective external objects, which may be relative to the vehicle, identifying one or more expected paths for respective external objects, which may include identifying a speed, a trajectory, or both, for an external object. Descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include a pedestrian operational environment monitor 4310, an intersection operational environment monitor 4320, a lane change operational environment monitor 4330, or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian operational environment monitor 4310 may monitor operational environment information corresponding to multiple pedestrian vehicle operational scenarios, the intersection operational environment monitor 4320 may monitor operational environment information corresponding to multiple intersection vehicle operational scenarios, and the lane change operational environment monitor 4330 may monitor operational environment information corresponding to multiple lane change vehicle operational scenarios.

An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the pedestrian operational environment monitor 4310 may receive, or otherwise access, information, such as sensor data, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, an aspect of the vehicle transportation network geometry, or the like.

An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information.

An operational environment monitor 4300 may output the information representing the one or more aspects of the operational environment to, or for access by, the autonomous vehicle operational management controller 4100, such by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the blocking monitor 4200.

The pedestrian operational environment monitor 4310 may correlate, associate, or otherwise process the operational environment information to identify, track, or predict actions of one or more pedestrians. For example, the pedestrian operational environment monitor 4310 may receive information, such as sensor data, from one or more sensors, which may correspond to one or more pedestrians. The pedestrian operational environment monitor 4310 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

The intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment, to identify vehicle transportation network geometry, or a combination thereof. For example, the intersection operational environment monitor 4320 may receive information, such as sensor data, from one or more sensors, which may correspond to one or more remote vehicles in the operational environment, the intersection, or one or more aspects thereof, in the operational environment, the vehicle transportation network geometry, or a combination thereof. The intersection operational environment monitor 4320 may associate the sensor data with one or more identified remote vehicles in the operational environment, the intersection, or one or more aspects thereof, in the operational environment, the vehicle transportation network geometry, or a combination thereof, which may include identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

The lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the vehicle, to identify one or more aspects of the operational environment, such as vehicle transportation network geometry in the operational environment, or a combination thereof geospatially corresponding to a current or expected lane change operation. For example, the lane change operational environment monitor 4330 may receive information, such as sensor data, from one or more sensors, which may correspond to one or more remote vehicles in the operational environment of the autonomous vehicle, one or more aspects of the operational environment, or a combination thereof geospatially corresponding to a current or expected lane change operation. The lane change operational environment monitor 4330 may associate the sensor data with one or more identified remote vehicles in the operational environment of the autonomous vehicle, one or more aspects of the operational environment, or a combination thereof geospatially corresponding to a current or expected lane change operation, which may include identifying a current or expected direction of travel, a path, such as an expected path, a current or expected velocity, a current or expected acceleration rate, or a combination thereof for one or more of the respective identified remote vehicles. The lane change operational environment monitor 4330 may output the identified, associated, or generated lane change information to, or for access by, the autonomous vehicle operational management controller 4100.

The autonomous vehicle operational management controller 4100 may identify one or multiple distinct vehicle operational scenarios based on one or more aspects of the operational environment represented by the operational environment information. The autonomous vehicle operational management controller 4100 may identify a distinct vehicle operational scenario in response to identifying, or based on, the operational environment information indicated by one or more of the operational environment monitors 4300. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the SSOCEMs 4400 based on one or more aspects of the operational environment represented by the operational environment information. For example, the autonomous vehicle operational management controller 4100 may instantiate a respective instance of a SSOCEM 4400 in response to identifying an upcoming scenario. An upcoming scenario may be a distinct vehicle operational scenario that the autonomous vehicle operational management controller 4100 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

A SSOCEM 4400, once instantiated, can receive the operational environment information, including sensor data, to determine and output a candidate vehicle control action, also called a candidate action herein. A candidate action is a vehicle control action that is identified by the particular SSOCEM 4400 as the likely optimal action for the vehicle to perform that will handle a particular scenario. For instance, a SSOCEM 4400 configured to handle intersections (e.g., an intersection SSOCEM 4420) may output a "proceed", a candidate action that suggests proceeding through an intersection. At the same time, a SSOCEM 4400 for handling lane changes (e.g., the lane change SSOCEM 4430) may output a "turn left" candidate action indicating that the vehicle should merge left by two degrees. In some implementations, each SSOCEM 4400 outputs a confidence score indicating a degree of confidence in the candidate action determined by the SSOCEM 4400. For instance, a confidence score greater than 0.95 may indicate a very high confidence in the candidate action, while a confidence score less than 0.5 may indicate a relatively low degree of confidence in the candidate action. Further details of a SSOCEM 4400 are described below.

The autonomous vehicle operational management controller 4100 receives the candidate actions and determines a vehicle control action based on the received candidate actions. In some implementations, the autonomous vehicle operational management controller 4100 utilizes hardcoded logic to determine the vehicle control action. For example, the autonomous vehicle operational management controller 4100 may select the candidate action having the highest confidence score. In other implementations, the autonomous vehicle operational management controller 4100 may select the candidate action that is the least likely to result in a collision. In other implementations, the autonomous vehicle operational management controller 4100 may generate a compound action based on two or more non-conflicting candidate actions (e.g., compounding 'proceed' and 'turn left by two degrees' to result in a vehicle control action that causes the vehicle to veer left and proceed through an intersection). In some implementations, the autonomous vehicle operational management controller 4100 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process (MDP), or a Partially Observable Markov Decision Processes (POMDP), which may describe how respective candidate actions affect subsequent candidate actions, and may include a reward function that outputs a positive or negative reward for respective vehicle control actions.

The autonomous vehicle operational management controller 4100 may uninstantiate an instance of a SSOCEM 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

The blocking monitor 4200 may receive operational environment information representing an operational environment, or an aspect thereof, for the vehicle. For example, the blocking monitor 4200 may receive the operational environment information from the autonomous vehicle operational management controller 4100, from a sensor of the vehicle, from an external device, such as a remote vehicle or an infrastructure device, or a combination thereof. The blocking monitor 4200 may read the operational environment information, or a portion thereof, from a memory, such as a memory of the autonomous vehicle, such as the memory 1340 shown in FIG. 1.

The blocking monitor 4200 may determine a respective probability of availability, or corresponding blocking probability, for one or more portions of the vehicle transportation network. The portions may include those portions of the vehicle transportation network corresponding to an expected path of the autonomous vehicle.

A probability of availability, or corresponding blocking probability, may indicate a probability or likelihood that the autonomous vehicle will traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 4200 may identify a respective probability of availability for each of multiple portions of the vehicle transportation network within an operational environment, such as within 300 meters, of the autonomous vehicle.

A probability of availability may be indicated by the blocking monitor 4200 corresponding to each external object in the operational environment of the autonomous vehicle and a geospatial area may be associated with multiple probabilities of availability corresponding to multiple external objects. An aggregate probability of availability may be indicated by the blocking monitor 4200 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 4200 may identify external objects, track external objects, project location information, path information, or both for external objects, or a combination thereof. For example, the blocking monitor 4200 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 4200 may communicate probabilities of availability, or corresponding blocking probabilities, to the autonomous vehicle operational management controller 4100. The autonomous vehicle operational management controller 4100 may communicate the probabilities of availability, or corresponding blocking probabilities, to respective instantiated instances of the scenario-specific operational control evaluation modules 4400.

Although not expressly shown in FIG. 4, the autonomous vehicle operational management system 4000 may include a predictor module that may generate and send prediction information to the blocking monitor 4200, and the blocking monitor 4200 may output probability of availability information to one or more of the operational environment monitors 4300.

Each SSOCEM 4400 may model a respective distinct vehicle operational scenario. The autonomous vehicle operational management system 4000 includes any number of SSOCEMs 4400, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 4400 may include one or more models that are configured to determine one or more vehicle control actions for handling a scenario given a set of inputs. The models may include, but are not limited to, Partially Observable Markov Decision Process (POMDP) models, Markov Decision Process (MDP) models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 4400 includes computer-executable instructions that define a manner by which the models operate and a manner by which the models are utilized.

A SSOCEM 4400 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 4400 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

For example, a POMDP model may include an autonomous vehicle at a first geospatial location and a first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

The set of conditional observation probabilities may be identified based on the operational environment information, such as the operational environment information described with respect to the reward function.

A SSOCEM 4400 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 4400 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 4400 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 4000 may include any number or combination of types of models. For example, the pedestrian SSOCEM 4410, the intersection SSOCEM 4420, and the lane change SSOCEM 4430 may implement POMDP models. In another example, the pedestrian SSOCEM 4410 may implement a MDP model and the intersection SSOCEM 4420 and the lane change SSOCEM 4430 may implement POMDP models. Further, the autonomous vehicle operational management controller 4100 may instantiate any number of instances of the SSOCEMs 4400 based on the operational environment information. A module 4440 is shown using broken lines to indicate that the autonomous vehicle operational management system 4000 may include any number or additional types of SSOCEMs 4400.

One or more of the autonomous vehicle operational management controller 4100, the blocking monitor 4200, the operational environment monitors 4300, or the SSOCEMs 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the blocking monitor 4200, the operational environment monitors 4300, or the SSOCEMs 4400 may be independent of the operational rate of others.

Figure 5:
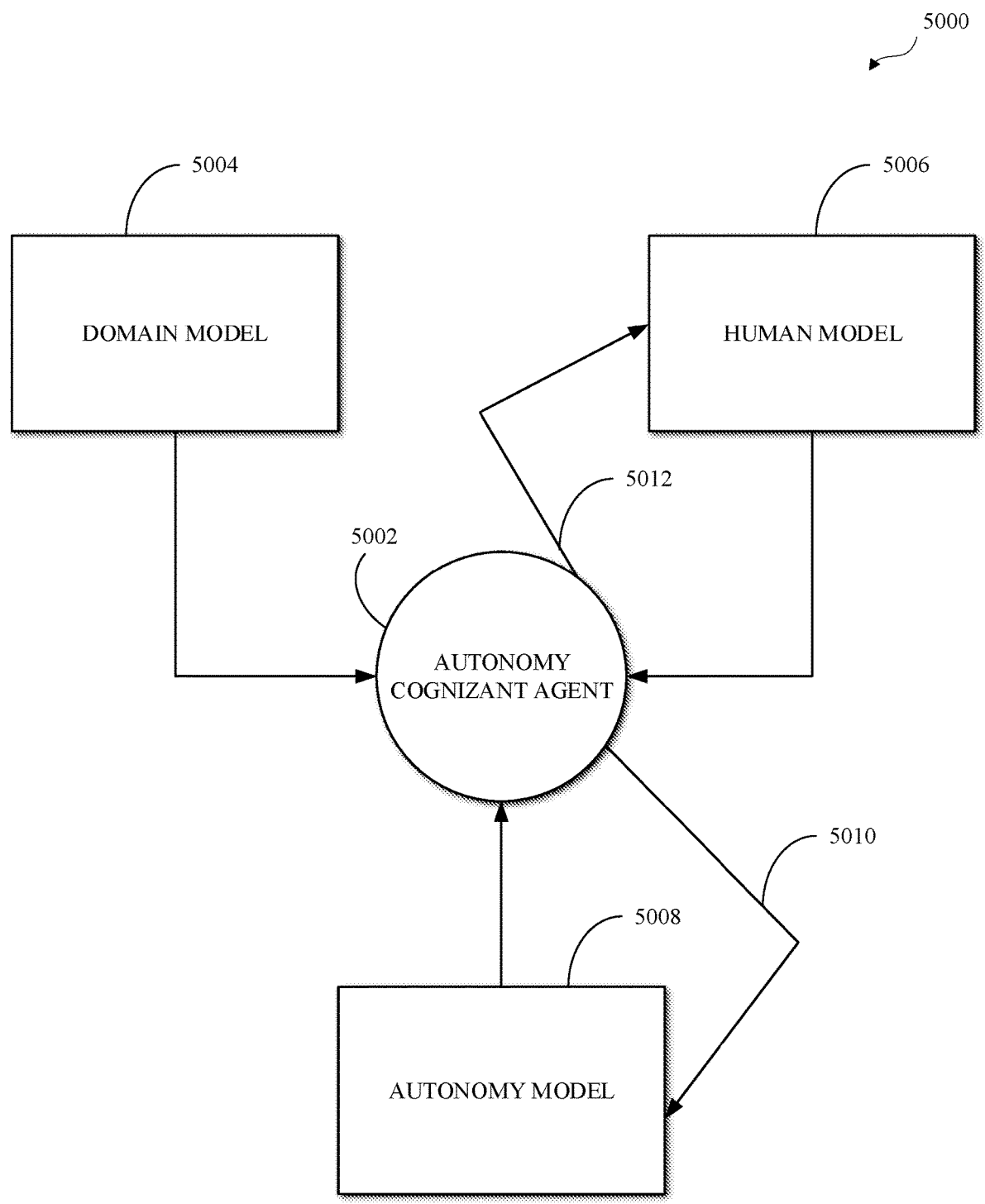
FIG. 5 is a diagram of an example of a competence aware system (CAS) in accordance with embodiments of this disclosure

FIG. 5 is a diagram of an example of a competence-aware system (CAS) 5000 in accordance with embodiments of this disclosure. The CAS 5000 includes an autonomy cognizant agent (ACA) 5002. Any of the SSOCEM, such one of the SSOCEM 4410, 4420, 4430, 4440 of FIG. 4 can be an ACA, as described below with respect to the ACA 5002. The ACA 5002 can have multiple levels of autonomy. The CAS 5000 can be the autonomous vehicle operational management system 4000 of FIG. 4.

The ACA 5002 can operate in, and plan for/with, multiple levels of autonomous operations (i.e., autonomy levels). When an AV performs a vehicle control action in an autonomy level, the AV (more specifically, the ACA) may receive a feedback signal (or simply, feedback) in response to the AV's execution of the vehicle control action. For example, the AV may perform the vehicle control action while being monitored by a human. The vehicle can be monitored remotely by a tele-operator. The vehicle can be monitored by an in-vehicle human. The human can cause a signal to be sent to, or received by, AV (or a module, component, circuitry, or the like therein, such as the ACA 5002) indicating the feedback.

The ACA 5002 can proactively determine which level of autonomy to enter. As such, the ACA 5002 can have a gradient of autonomy levels. Thus, the ACA 5002 can maintain robustness without requiring the same expense of all-or-none (i.e., binary) autonomy. Thus, the ACA 5002 can proactively avoid situations it cannot navigate autonomously and can proactively issue a request for help before the AV is stuck. Proactively requesting help can reduce wasted operational time and resources.

As further described below, the ACA 5002 can learn from its experiences of traversing a portion of a vehicle transportation network the autonomy level to enter when traversing the same or similar portions of the vehicle transportation network. That is, the ACA 5002 can learn from its experience to predict a feedback to be received from a human operator, such as a tele-operator or an in-vehicle human.

The ACA 5002 can modify its choice of autonomy level based on new knowledge acquired during the traversal of the portion of a vehicle transportation network. The learned prediction can be used to modify how the ACA 5002 traverses the portion of the vehicle transportation network. For example, no request for human assistance should be issued when the ACA 5002 has a high confidence in the response that would be received from the human. As such, the ACA 5002 requests assistance only in situations where the ACA 5002 is confident that the ACA 5002 cannot handle the situation autonomously. Additionally, the ACA 5002, can proactively avoid situations that the ACA 5002 determines (based on its competence levels) that the ACA 5002 requires human assistance. Thus, the ACA 5002 can favor situations it can navigate autonomously. For example, the ACA 5002 can replan (e.g., determine a new route) to avoid the situation.

The ACA 5002 uses as input a domain model (DM) 5004, a human model (HM) 5006, and an autonomy model (AM) 5008. The HM 5006 can also be referred to as a feedback model. The ACA 5002 updates the HM 5006, as illustrated by an arrow 5012 and as further described below. The ACA 5002 updates the AM 5008, as illustrated by an arrow 5010 and as further described below.

The DM 5004 can model the environment (i.e., the operational environment) that the ACA 5002 is operating in, as described above.

The AM 5008 can model the levels of autonomy that the ACA 5002 can operate in, when (e.g., under what conditions or constraints) the ACA 5002 can be allowed to operate at each of the autonomy levels, and what are the respective utilities of the levels of autonomy. Utility can indicate the expected value of executing a vehicle control action in the respective autonomy level. The utility values can be used to represent preferences among the autonomy levels.

The HM 5006 can describe a feedback model that models the feedback that the ACA 5002 can receive from the human (e.g., a tele-operator), how costly each type of feedback is, and how likely is the ACA 5002 to receive each type of feedback.

As mentioned, the DM 5004 can model the environment (i.e., the operational environment) that the ACA 5002 is operating in. For example, the DM 5004 can describe (e.g., include) transition and/or cost dynamics of the environment with respect to the ACA 5002. In an example, the DM 5004 can be modeled as a Stochastic Shortest Path (SSP) problem. As is known, SSP is a formal decision-making model for reasoning in fully observable, stochastic environments where the objective can be to find the least-cost path from a start state to a goal state. For example, the goal of the ACA 5002 may to be successfully traverse an intersection. As such, a start state can be a first temporal location before the intersection (e.g., 50 meters before the intersection) and the goal state can be a second temporal location after passing the intersection (e.g., 50 meters after the intersection). As the ACA 5002 is approaching the intersection, the ACA 5002 plans a trajectory, including a set of actions, to accomplish the goal. As a result of the planning, the ACA 5002 selects, according to the HM 5006 and the AM 5008, a next action to perform in an autonomy level.

The DM 5004 can be formally modeled as tuple $\langle S, A, T, C, s_o, s_g \rangle$. S can be a finite set of states (i.e., a set of sets of operational environment information). A can be a finite set of actions (i.e., a set of vehicle control actions). T (i.e., T: $S \times A \times S \rightarrow [0,1]$) can represent the probability of reaching a state $s' \in S$ after performing an action $a \in A$ in state $s \in S$. C (i.e., C: $S \times A \rightarrow C$) can represent the expected immediate cost of performing an action $a \in A$ in state $s \in S$. $s_0$ can be an initial state. $s_g$ can be a goal state such that $\forall a \in A, T(s_g, a, s_g)=1$ and $C(s_g, a)=0$, which indicates that once the goal state $s_g$ is reached, the system remains in the goal state no matter which action is then taken and that every action taken in the goal state $s_g$ has a cost of 0.

A solution to the SSP of the DM 5004 can be a policy $\pi$: $S \rightarrow A$. That is, under the policy $\pi$, an action a (i.e., $\pi(s)$) is selected for a state s. That is, the policy $\pi$ can indicate that the action $\pi(s) \in A$ should be taken in state s. The policy $\pi$ can include a value function $V^\pi$: $S \rightarrow C$ that can represent the expected cumulative cost $V^\pi(s)$ of reaching the goal state, $s_g$, from a state s following the policy $\pi$. That is, the value function provides a cost (i.e., a value) for each intermediate state $s_i$, from the start state until the goal state is reached. An optimal policy, $\pi^*$ minimizes the expected cumulative cost.

Thus, for every state configuration of interest, the policy can be used to determine an action that the AV will take in that state. A descriptive example of a state can be "pedestrian ahead of AV" and "AV at stop sign." Such a state can have associated the action "stop" to avoid hitting the pedestrian. Another descriptive example of a state can be "AV inside intersection" and "other vehicle at stop sign." Such a state can have associated the action "go" so that the AV can complete crossing the intersection.

Intuitively stated, the DM 5004 can include a descriptor for how the world (i.e., the operational environment) changes with one time step for all the combinations of states. The DM 5004 can include a notion of good states and bad states. That is, the DM 5004 can include descriptors of what configurations of the world are good. For example, in the scenario of crossing an intersection, a good state is a state in which the AV completes crossing the intersection; and a bad state may correspond with the AV colliding with another vehicle or a state in which the AV violated a law. A negative reward can be associated with a bad state and a positive reward can be associated with a good state. Given such descriptors and rewards, an optimal policy π*, which is a set of actions (or equivalently, a path through the operational environment), that maximizes can reward, can be computed as a function of how the operational environment evolves over time.

As mentioned, the AM 5010 can model the extent of autonomous operation (i.e., the autonomy level) that the ACA 5002 can operate in. An autonomy level can indicate both the actual different forms or extents of autonomous operations (as described below with respect to the set of levels of autonomy $\mathcal{L}$) as well as when each of the autonomy levels can be allowed under some external constraints (as described below with respect to an autonomy profile κ).

The AM 5008 can be formally modeled as a tuple $\langle \mathcal{L}, \kappa, \mu \rangle$, where $\mathcal{L}$ denotes a set of autonomy levels, κ denotes an autonomy profile, and μ denotes a utility function.

$\mathcal{L} = \{l_0, \ldots, l_n\}$ can be the set of levels of autonomy. Each autonomy level $l_i$ can correspond to a set of constraints on the autonomous operation of the ACA 5002. In an example, the set of action $\mathcal{L}$ can be a partially ordered set (i.e., a poset). That is, the actions of the set $\mathcal{L}$ have an order or sequence indicating, for example, in increasing level of autonomy.

In an example, the levels of autonomy of the set $\mathcal{L}$ can include four levels of autonomy; namely a "no-autonomy" level (i.e., $l_0$), a "verified-autonomy" level (i.e., $l_1$), a "supervised-autonomy" level (i.e., $l_2$), and an "unsupervised-autonomy" level (i.e., $l_4$). The disclosure herein is not limited to such autonomy levels set, L. That is, other autonomy levels with different semantics are possible.

The "no-autonomy" level, $l_0$, can indicate that the ACA 5002 requires a human to perform the action for instead of the ACA 5002. The no-autonomy level can be summarized as the AV requesting that the human completely control the AV so that the human can get the AV out of a situation (e.g., an obstruction scenario).

The "verified-autonomy" level, $l_1$, can indicate that the ACA 5002 must query for, and receive, explicit approval from a human operator, before even attempting a selected (e.g., identified, determined, etc.) action. For example, in a sequence of actions (i.e., a plan) determined by the ACA 5002, the ACA must ask for explicit approval for each action before the action is performed.

The "supervised-autonomy" level, $l_2$, can indicate that the ACA 5002 can perform the action autonomously as long as there is a human supervising (e.g., remotely, or otherwise, monitoring) the ACA 5002. In the "supervised-autonomy" level, $l_2$, the human can intervene in the case that something goes wrong while the action is being autonomously performed. For example, a sequence of actions can be performed as long as a human is supervising the AV. If before or after performing an action of the sequence of actions, a failure is detected, then the ACA can request human (e.g., tele-operator) assistance.

To clarify the delineation between "verified-autonomy" level, $l_1$, and "supervised-autonomy" level, $l_2$, an example is now given. In "supervised-autonomy" level, $l_2$, the monitoring need not be remote. For example, an AV's testing procedure can be considered "supervised autonomy" as the AV can drive autonomously, but only with a supervising human in the AV who can be ready to override the AV and take control in dangerous situations. As a further delineation, "verified-autonomy" level, $l_1$, can require that the ACA receive explicit permission from a human (who may be either in the AV or remote), before executing the desired action. In particular, receiving explicit permission can mean that the ACA should stop until it receives the permission. On the other hand, in the "supervised-autonomy" level, $l_2$, there is no such requirement as long as there is a supervising human. That is, the ACA need not stop and can continuously perform its desired action, relying on the supervising human authority to override in the case of potential danger.

The "unsupervised-autonomy" level, $l_3$, can indicate that the ACA 500 can be in full autonomous operation without requiring approval, supervision, or monitoring by a human.

The autonomy profile, κ (i.e., κ: S×A→P($\mathcal{L}$)), can map a state s∈S and an action a∈A to a subset of the set of autonomy levels, $\mathcal{L}$. P($\mathcal{L}$) denotes the powerset of the set $\mathcal{L}$ of autonomy levels. The autonomy profile κ can prescribe constraints on the allowed levels of autonomy for any situation (i.e. a state of the DM 5004). Given a current state of the environment and an action to be performed next, the autonomy profile, κ, defines a set of acceptable autonomy levels.

The constraints can be, or can include, hard constraints. For example, a constraint can be a technical, legal, or ethical constraint. To illustrate, a non-limiting example of a legal constraint can be that an autonomous vehicle cannot operate autonomously (i.e., at the unsupervised-autonomy level, $l_4$) in a school zone. A non-limiting example of a social constraint can be a rule of the road whereby when a traffic signal turns green, on-coming traffic yields to the first left-turning vehicle. Thus, a constraint is that the first left-turning vehicle must proceed instead of waiting for the traffic to clear.

The constraints can be, can include, or can be used as, temporary conservative constraints that can be updated over time as the ACA 5002 improves. The autonomy profile κ can constrain the space of all policies (π) so that the ACA 5002 is only allowed to follow a policy that never violates the autonomy profile κ.

In the AM 5008, μ of the tuple $\langle \mathcal{L}, \kappa, \mu \rangle$ can represent the utility, r∈ℝ, of performing action a∈A at autonomy level l'∈$\mathcal{L}$ given that the ACA 5002 is in a state s∈S and just operated in level l∈$\mathcal{L}$; that is, μ: S×$\mathcal{L}$×A×$\mathcal{L}$→ℝ. As such, the utility μ can be denoted as μ: S×$\mathcal{L}$×A×$\mathcal{L}$→ℝ.

The utility μ represents the following: Given that an action at timestep t was performed at autonomy level l, what is the utility of performing another action at timestep t+1 at another autonomy level l'? The action at timestep t+1 need not be, but can be, the same action as that taken at timestep t. There may be a negative utility associated with swapping autonomy levels in some situations. For example, in a dynamic situation (e.g., a complex intersection), in which the ACA may, given no utility μ, swap between "supervised autonomy" and "unsupervised autonomy" at every time step. The constant swapping of autonomy levels may in fact be more discomforting to a human who must constantly make an attention swap, than simply remaining in "supervised" mode the entire time.

As further described below, the AM 5008 can evolve. That is, the AM 5008 can be trained, based on the experiences of the ACA 5002. To illustrate, assume that a first AV is to be deployed to a first market (e.g., Japan) and a second AV is to be deployed to a second market (e.g., France). The first AV and the second AV may initially include the same autonomy model, which operates in the binary autonomy modes. That is, either the AV can confidentially handle a situation that it is programmed a priori to recognize and traverse or the AV requests human (e.g., tele-operator) assistance. As each of the first market and the second market may have different (e.g., social) rules of the road, the autonomy model of the first AV evolves differently from the autonomy model of the second AV based on feedback that each receives from humans. Once an autonomy model learns of the situations that it is competent to handle in its respective market, the ACA no longer needs to request human (e.g., tele-operator) assistance for the learned situations (i.e., scenarios).

As mentioned above, the HM 5006 (i.e., the feedback model) can model the belief of the ACA 5002 about the interactions of the ACA 5002 with a human operator. The HM 5006 can be formally represented as a tuple $\langle \Sigma, \lambda, \rho, \tau \rangle$, where $\Sigma$ denotes a set of feedback signals, $\lambda$ denotes a feedback profile, $\rho$ denotes a human cost function, and $\tau$ denotes a human state transition function.

$\Sigma = \{\sigma_0, \ldots, \sigma_n\}$ can be a set of possible feedback signals that the ACA 5002 can receive from the human operator. Non-limiting examples of feedback signals are described below with respect to FIG. 6. The feedback profile, $\lambda$, can represent the probability that the ACA 5002 receives a signal $\sigma \in \Sigma$ when performing the action $a \in A$ at an autonomy level $l' \in \mathcal{L}$ given that the ACA 5002 is in a state $s \in S$ and the ACA 5002 just operated in an autonomy level $l \in \mathcal{L}$. As such, the feedback profile $\lambda$ can be represented symbolically as $\lambda: S \times \mathcal{L} \times A \times \mathcal{L} \to \Delta^{|\Sigma|}$.

"Just operated in" can mean the following: At a timestep t, "just operated in" can mean the level of autonomy that the action the ACA took at timestep t−1 was performed in. As an example, assume that at timestep t the ACA performed action a at autonomy level $l_2$ (i.e., "supervised-autonomy"). As such, the human is already engaged and observing the behavior of the ACA. If, at timestep t+1, the ACA performs an action a' again at autonomy level $l_2$, the probability that the human will override the action a' may be lower than if the ACA performed action a at autonomy level $l_3$ (i.e., "unsupervised-autonomy") in which case the human may be more surprised and hence may be more likely to override the action.

The human cost function, $\rho$, can return a positive cost to the human of performing action $a \in A$ at an autonomy level $l' \in \mathcal{L}$ given that the ACA 5002 is in a state $s \in S$ and the ACA 5002 just operated in autonomy level $l \in \mathcal{L}$. The human cost function, $\rho$, can be represented symbolically as $\rho: S \times \mathcal{L} \times A \times \mathcal{L} \to \mathbb{R}^+$.

The human state transition function, $\tau$, can represent the probability of the human (e.g., tele-operator) taking the ACA 5002 to state $s' \in S$ when the ACA 5002 selected to perform an action $a \in A$ in a state $s \in S$ and the human took control over the AV. "Taking the ACA 5002 to a state s" means that the human operates the AV so that the state s is realized. The human state transition function, $\tau$, can be represented symbolically as $\tau: S \times A \to \Delta^{|S|}$. For example, assume that the state is s (e.g., s="at an intersection") and the ACA intends to take action a (e.g., a="make a left turn"), but the human overrides the ACA and takes over control. In this case, the human state transition function, $\tau$, represents the probability that the human takes the ACA to some state (e.g., completes the left turn or, instead, goes straight) given the state the ACA was in (i.e., the state s) and the action the agent intended to take (i.e., make a left turn).

It is noted that, in practice, the feedback profile, $\lambda$, and the human state transition function, $\tau$, are not known a priori. As such, the ACA 5002 can maintain respective estimates of the feedback profile, $\lambda$, and the human state transition function, $\tau$, based on previous data the ACA 5002 gathers in the same or similar situations. Updating the HM 5006 is illustrated by an arrow 5012. As such, and as further described with respect to FIG. 6, after the ACA 5002 performs an action (in an action execution stage), the system 5000 can record the feedback that the ACA 5002 receives from the human operator, if any, and can use the feedback to update at least one of the feedback profile, $\lambda$, or the human state transition function, $\tau$.

The system 5000 (i.e., the competence-aware system (CAS)), and more specifically, the ACA 5002, can be thought of as being (e.g., defining, determining, etc.) a solution to a problem that combines the DM 5004, the HM 5006, and the AM 5008 in the context of automated planning and decision making.

While the DM 5004 can represent the fundamental underlying SSP that the ACA 5002 finds a solution to, the ACA 5002 can use the AM 5008 to proactively generate plans that operate across multiple levels of autonomy (e.g., for and using the different autonomy levels). This is to be contrasted with autonomy agents that may adjust a plan during the plan execution. The proactively generated plans can be subject to a set of constraints $\kappa$. The ACA 5002 can use the HM 5006 to predict the likelihood of each feedback signal ahead of time so that the ACA 5002 can avoid situations that the ACA 5002 is unlikely to be able to operate autonomously in.

The system 5000 can combine all three of the DM 5004, the HM 5006, and the AM 5008 into one decision-making framework. The system 5000 (and more specifically, the ACA 5002) is used to solve the problem of generating a policy for accomplishing its task (e.g., successfully crossing an intersection).

The problem can be defined formally as an extended SSP, the details of which are now presented. The competence-aware system (CAS) can be represented as a tuple $\langle \overline{S}, \overline{A}, \overline{T}, \overline{C}, \overline{s}_0, \overline{s}_g \rangle$, where $\overline{S} = S \times \mathcal{L}$ is a set of factored states, where S is the set of domain states and $\mathcal{L}$ is the set of levels of autonomy; (in MDP, a "factored state" is a state that can be represented as a vector of distinct components or features; thus, a "factored state" $\overline{s}$ is a state that can be formally represented as a vector of features <feature$_1$, feature$_2$, ..., feature$_n$> for some set of features);

$\overline{A} = A \times \mathcal{L}$ is a set of factored actions, where A is the set of domain actions and $\mathcal{L}$ is the set of levels of autonomy;

$\overline{T}: \overline{S} \times \overline{A} \to \Delta^{|\overline{S}|}$ is a transition function that includes a state transition function $T_{l_i}: S \times A \to \Delta^{|\overline{S}|}$ for each autonomy level $l_i$ in the set $\mathcal{L}$ of autonomy levels; ($\Delta^{|\overline{S}|}$ represents the simplex of dimension $|\overline{S}|$, which represents a probability distribution over $\overline{S}$ given a state s in S and an action a in A. For example, given a state s in S and an action a in A, under the notation, T(s, a) can be thought of as a list $[(p_1, s_1), (p_2, s_2), \ldots, (p_n, s_n)]$ where $p_i$ is the probability of reaching state $s_i$ given the tuple (s, a));

$\overline{C}: \overline{S} \times \overline{A} \to \mathbb{R}^+$ is a positive cost function that includes C (i.e., the expected immediate cost of performing an action $a \in A$ in state $s \in S$), the utility $\mu: \overline{S} \times \overline{A} \to \mathbb{R}$, and the human cost function $\rho: \overline{S} \times \overline{A} \to \mathbb{R}^+$;

$\overline{s}_0 \in \overline{S}$ is the initial state such that $\overline{s}_0 = \langle s_0, 1 \rangle$ for some autonomy level $l \in \mathcal{L}$; and $\overline{s}_g \in \overline{S}$ is the goal state such that $\overline{s}_g = \langle s_g, 1 \rangle$ for some autonomy level $l \in \mathcal{L}$.

As mentioned, a solution to the above extended SSP problem is a policy $\pi$ that maps states and autonomy levels $\overline{s} \in \overline{S}$ to actions and autonomy levels $\overline{a} \in \overline{A}$. That is, given that the ACA was just in state $\overline{s} = (s, l)$, $\pi(\overline{s})$ returns some action $\overline{a} = (a, l)$ for the ACA to take. In general $\pi(\overline{s})$ returns the best (e.g., cost-optimal) action for the ACA to take. The space of policies π that the ACA 5002 can solve for can be restricted by constraints, as described above with respect to the autonomy profile κ. The space of policies π that the ACA 5002 can solve for can be restricted as follows.

Let $\bar{a} = \langle a, 1 \rangle$ be a factored action of the set of factored actions, $\bar{A}$. Given a factored state $\bar{s} = \langle s, 1' \rangle$ of the set of factored states $\bar{S}$, the combination of the factored state and action, $(\bar{s}, \bar{a})$, can be allowed if the action $1 \in \kappa(s, a)$. That is, the combination of the factored state and action, $(\bar{s}, \bar{a})$ is allowed if the combination of the action $\bar{a}$ and the state $\bar{s}$ is allowed under the autonomy profile κ. Additionally, a policy π can be allowed if for every state $\bar{s} \in \bar{S}$, the combination of the state $\bar{s}$ and the action under the policy π, (i.e., $(\bar{s}, \pi(\bar{s}))$), is allowed. Let Π denote the set of all policies. As such the policy $\pi \in \Pi$. The set of allowed policies can be denoted $\Pi_k$. A solution to the above extended SSP problem can be required to be taken from $_{\pi \in \Pi_\kappa} J(\pi)$. $J(\pi)$ represents the expected cost that the ACA will receive when following the policy π starting in the initial state as defined in the SSP definition.

Because policies are restricted to be chosen from $\Pi_\kappa$, if the autonomy profile κ is altered, so too is the space of allowed policies. This in turn can mean that the optimal policy, π*, can be, intuitively, only as good as the function κ. Hence there is a trade-off when deciding the initial constraints (κ) on the allowed autonomy.

In an implementation, a conservative approach, which constrains the system significantly, can be selected, such as by setting |κ(s, a)|=1 for every (s, a)∈S×A, thereby reducing the problem complexity to solving the underlying domain model with deterministic levels. However, doing so risks a globally suboptimal policy with respect to the level of autonomy $\mathcal{L}$ and may, depending on the initial autonomy profile, κ, make reaching the globally optimal policy impossible.

In another implementation, a risky approach can be chosen by not constraining the system at all a priori, thereby leaving the decision of choosing a level of autonomy completely up to the system. This approach, while necessarily containing the optimal policy (subject to the ACA's model) is naturally slower due to the larger policy space and inherently less safe as the ACA can take actions in undesirable levels, in some sense defeating the entire purpose of the model.

In yet another implementation, in most domains, the ideal initialization can be somewhere closer to the middle of the above extremes. The autonomy profile κ can be less constraining in situations where the expected cost of failure is relatively low, and more constraining in situations where the cost of failure is high. For instance, in an AV, the autonomy profile κ can be more constraining initially in situations involving pedestrians, poor visibility, or chaotic environments such as large intersections with multiple vehicles; however, driving along a highway is generally low-risk and may benefit much less from a constrained autonomy profile.

Figure 6:
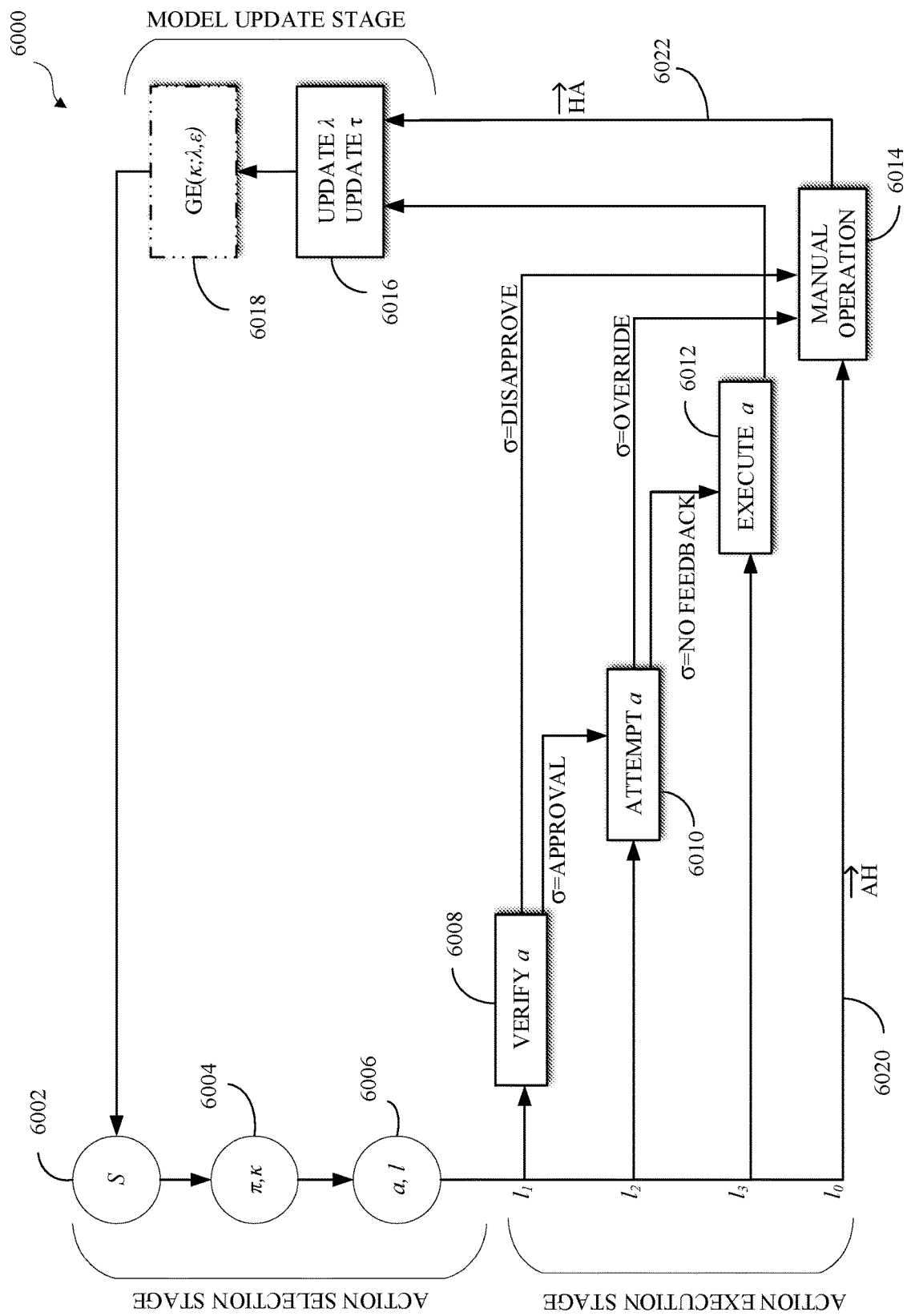
FIG. 6 is an example of a flowchart of a technique for competence-aware decision making in accordance with embodiments of this disclosure.

FIG. 6 is an example of a flowchart of a technique 6000 for competence-aware decision making in accordance with embodiments of this disclosure. The technique 6000 can be implemented by a competence-aware system (CAS), such as the competence-aware system (CAS) 5000 of FIG. 5. The technique 6000 can be implemented by an autonomy cognizant agent, such as the ACA 5002 of FIG. 5. Some or all of the operations of the technique 6000 can be implemented by a SSOCEM 4400, or by another component of the autonomous vehicle operational management system 4000 of FIG. 4.

The flowchart 6000 illustrates how a CAS, or an ACA of a CAS, can select an action, receive feedback, and update model(s) subject to experience(s). The flowchart 6000 is described with reference to FIG. 7.

Figure 7:
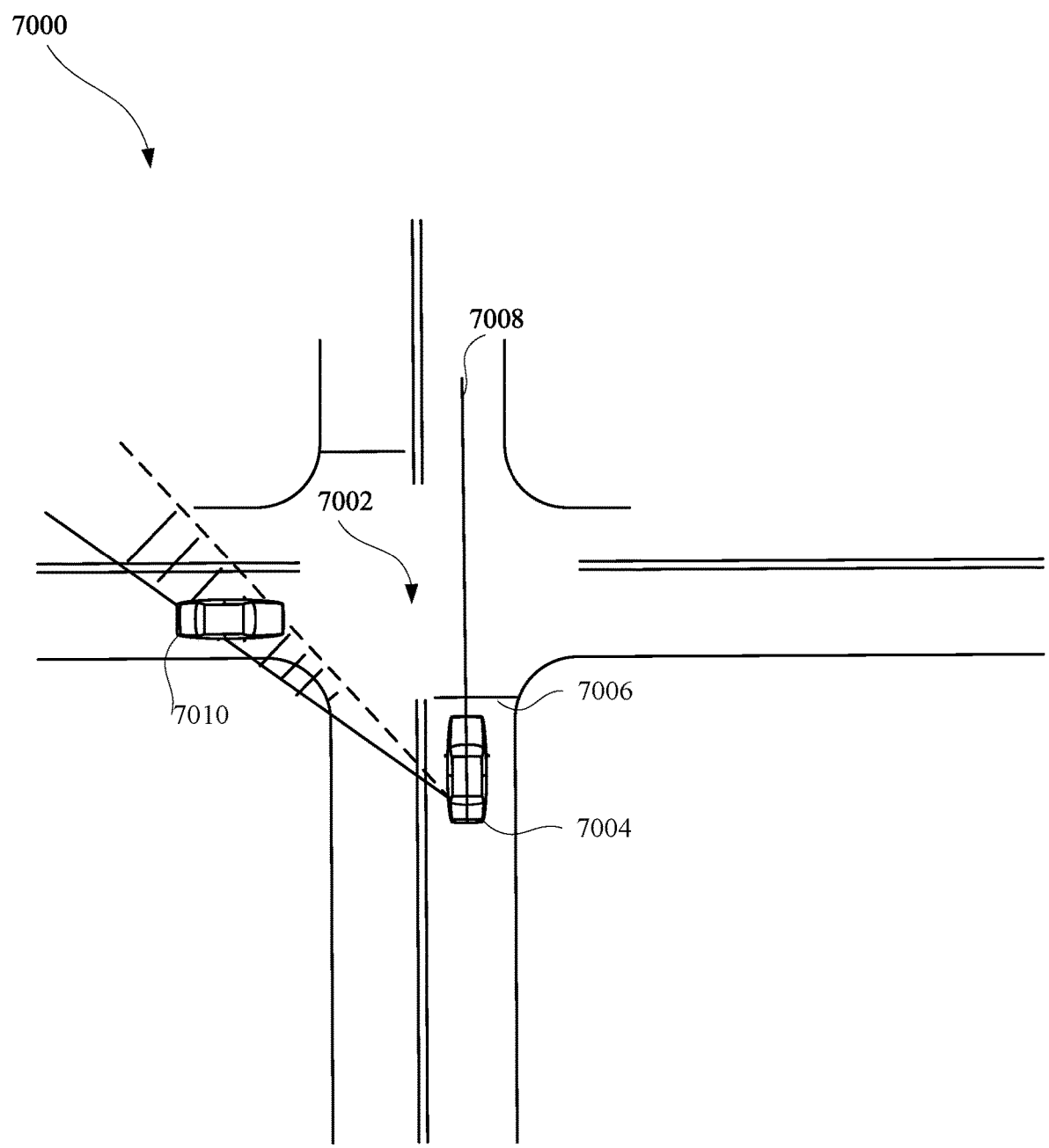
FIG. 7 is a diagram of a scenario of autonomous driving used to explain the technique 6000 of FIG. 6.

FIG. 7 is a diagram of a scenario 7000 of autonomous driving used to explain the technique 6000 of FIG. 6. The scenario 7000 includes an intersection 7002. A vehicle 7004 is approaching the intersection 7000. A stop line 7006 (i.e., a stop sign) is a line where the vehicle 7004 is supposed to stop to ensure that it can safely proceed along a trajectory 7008 (i.e., a path). The vehicle 7004 can the vehicle 1000 of FIG. 1. The vehicle 7004 can be one of the vehicles 2100/2110 of FIG. 2. The vehicle 7004 can include an autonomous vehicle operational management system, such as the autonomous vehicle operational management system 4000 of FIG. 4. The vehicle 7004 can include a competence-aware system (CAS), such as the system 5000 of FIG. 5. As such, the vehicle 7004 can be an autonomous vehicle or can be a semi-autonomous vehicle. A human operator (e.g., tele-operator or in-vehicle operator) can be responsible for (remotely) monitoring and assisting the vehicle 7004, such as in response to the vehicle 7004 issuing a remote request for assistance from the tele-operator.

The flowchart 6000 is described with respect to a domain model (such as the DM 5004 of FIG. 5) relating to an intersection scenario, such as the intersection 7002 of FIG. 7.

The domain model of the intersection scenario of FIG. 7 can include abstracted (e.g., symbolic) information that is extracted based on sensor (LiDAR, radar, camera, etc.) information. For example, the domain model can include information such as the location of the vehicle 7004 (e.g., "approaching stop line of intersection"), other relevant world objects (e.g., "a vehicle on left side" that is a vehicle 7010), road configuration (e.g., "east-west road is thru traffic" meaning that the are no traffic signals, stop signs, yield signs or the like), other relevant information to the scenario (e.g., "object on left has not moved in a long time," "left-side sensors obstructed," etc.).

As can be appreciated, an identified obstruction or occluding object (such as the vehicle 2010) may be identified as such when the vehicle 7004 is at certain distance from the obstruction. However, as the vehicle 7004 approaches the occlusion or obstruction, it may be determined that the occlusion or obstruction isn't so. This may be due to noise in the sensor data. As such, the state associated with the scenario is modified at 6002 of FIG. 6 and a new plan is computed.

More generally, the scenario can be described in an abstract state space and/or as a combination of objects detected and which are relevant to the scenario. The state can include every object that is necessary for successful autonomy, or at least semi autonomy. For every one of those objects, a state space for the AV (e.g., the vehicle 7004) relative to that object (e.g., the vehicle 7010) can be maintained. The combination of all of state spaces together can form (e.g., constitute, be, etc.) the domain space that is competence modeling is performed against. Thus, competence is modeled with respect to entity-to-entity pairings with respect to each pair of AV-to-another-entity that is relevant to the scenario. If for example, the scenario 7000 included a relevant pedestrian, then a competency modeling (i.e., determining an autonomy level) is then separately determined for the vehicle 7004-to-pedestrian pairing.

The states used in the domain model or the states used to evolve the system can be specified at different levels of granularity. To illustrate, and as non-limiting examples, the domain model can be for the specific intersection 7002; the domain model can be all similarly configured intersections in any geographic region of interest; the domain model can relate to crossing one or more intersections at a certain time of the day; the domain model can include additional metadata information, such as the location of the intersection include a proximal venue and that a concert has just completed; and so on.

The flowchart 6000 is described with respect to a set of action A. The set of actions relate to the domain. With respect to the domain of intersections, the actions can include the actions "go," "stop," and "edge." However, the set of actions can include more, fewer, other actions, or a combination thereof. In another scenario, the set of actions can be a different set of actions. For example, with respect to a passing scenario, the actions can include the actions "follow," "stop," "pass left," and "pass right."

The action "go" can mean proceed along the trajectory 7008. The action "stop" means that the vehicle should, in the next step/action step, remain stationary, or to stop if it were moving. The action "edge" can mean that the vehicle 7004 should edge slightly forward from a stop location, such as the stop line 7006. An "edge" action can be useful when, for example, in a current location of the vehicle 7004 the sensors of the vehicle 7004 are obstructed. For example, in the scenario 7000, a view of the left-side sensors of the AV 7004 are obstructed by a vehicle 7010. As such, and much as a human driver may perform, an "edge" action causes the vehicle 7004 to advance slightly into the intersection to attempt to see beyond the vehicle 7010.

The flowchart 6000 is described with respect to a set of autonomy levels $\mathcal{L}$ that includes four autonomy levels, $\mathcal{L}=\{l_0, l_1, l_2, l_3\}$.

The autonomy level $l_0$ can indicate "no autonomy," which can mean that direct human assistance is required and that the ACA of vehicle 7004 has determined that it is not competent to perform a determined action, if any.

The autonomy level $l_1$ can indicate "verified autonomy," which can mean that the ACA of the vehicle 7004 is to query for, and receive, human (e.g., tele-operator) approval prior to executing a selected action. Assistance is required because the ACA of the vehicle 7004 has determined that it is not competent to fully autonomously perform the determined (e.g., selected) action.

The autonomy level $l_2$ can indicate "supervised autonomy," which requires that a human be present (e.g., remotely monitoring) and available to intervene in the case of failure while the selected action is being performed.

The autonomy level $l_3$ can indicate "unsupervised autonomy," which can mean that a selected action can be executed (i.e., performed) without human intervention, supervision, monitoring, or the like, at all. That is, the autonomy level $l_3$ indicates that the ACA is fully competent to perform the action.

The flowchart 6000 is described with respect to a set of feedback signals E that includes four feedback signals; namely, the set $\Sigma$={no feedback, approval, disapproval, override}. For ease of reference, the "no feedback," "approval," "disapproval," and "override" signals can be denoted, respectively, ø, ⊕, ⊖, and Ø. Thus, the feedback signals set $\Sigma$ can be $\Sigma=\{ø, ⊕, ⊖, Ø\}$. As the labels imply, "no feedback" (e.g., ø) can mean that the ACA of the vehicle 5004 does not receive any explicit feedback from the human; "approval" (e.g., ⊕) can mean that the human approves an action selected by the ACA; "disapproval" (e.g., ⊖) can mean that the human does not approve the action selected by the ACA, which in turn can mean that the action is not taken and that the ACA should replan for another action; and "override" (e.g., Ø) can mean that the human takes over manual operation of the vehicle 7004.

Additionally, the flowchart 6000 assumes that the feedbacks "approval" and "disapproval" can be only be received in the autonomy level $l_1$ (i.e., "verified autonomy") and the feedback "override" can only be received in autonomy level $l_2$ (i.e., "supervised autonomy").

The state transition function, T, of the domain model for a factored state $\bar{s}^7$, a factored action $\bar{a}$, and an end state §' can be given by equation (1):

$$\bar{T}(\bar{s}, \bar{a}, \bar{s}') = \begin{cases} \tau(s, a, s') & \text{if } l = l_0 \\ \lambda(\oplus)T(s, a, s') + \lambda(\ominus)[s = s'] & \text{if } l = l_1 \\ \lambda(\emptyset)T(s, a, s') + \lambda(\oslash)T_H(s, a, s') & \text{if } l = l_2 \\ T(s, a, s') & \text{if } l = l_3 \end{cases} \quad (1)$$

In equation (1), $\lambda(\bullet)=\lambda(\bullet|\bar{s}, \bar{a})$ and [•] denotes Iverson brackets. Equation (1) can be summarized as follows: when the ACA operates in autonomy level $l_0$ (i.e., "no autonomy"), the ACA can follow the transition dynamics of the human (e.g., the tele-operator) who takes control; when the ACA operates in autonomy level $l_1$ (i.e., "verified autonomy"), the probability that the vehicle 7004 arrives in state s' is the probability that the ACA is approved to take the action multiplied by the probability that the ACA succeeds in following T plus the probability that the action is disapproved and the state remains the same; when the agent operates in autonomy level $l_2$ (i.e., "supervised autonomy"), the probability that the vehicle 5004 arrives in state s' is the probability that the ACA succeeds in following T without any human intervention plus the probability (i.e., $T_H$ in equation (1)) that the human overrides the action selected by the ACA and the human takes the vehicle to that state; and when the ACA operates in autonomy level $l_3$ (i.e., "unsupervised autonomy"), the ACA follows the transition dynamics of its own model (e.g., domain model).

The cost $\bar{C}$ associated with the state $\bar{s}$ and the action $\bar{a}$ can be updated according to equation (2).

$$\bar{C}(\bar{s}, \bar{a}) = C(s, a) + \mu(\bar{s}, \bar{a}) + \rho(\bar{s}, \bar{a}) \quad (2)$$

Equation (2) states that the cost $\bar{C}$ of taking action $\bar{a}=(a, l')$ in state $\bar{s}=(s, l)$ in the extended SSP is equal to the domain cost of taking action a in state s (e.g., the time+energy of making a left turn at an intersection) plus the utility of performing action a in autonomy level l' given that the system was just in state $\bar{s}$, which may be positive or negative as described above, plus the human cost of performing action a in autonomy level l' given that the system was just in state (e.g., asking for teleoperation), which may be 0, such as if the autonomy level l' does not involve a human.

Having described the model of the competence-aware system or an autonomy cognizant agent therein, the technique 6000 can be summarized as including three stages: an action selection stage, an action execution stage, and a model update stage. In the action selection stage, an action and a level of autonomy are selected. In the action execution stage, the action is carried out according to the level of autonomy and feedback, such as from a human operator, may be received. In the model update stage, the technique 6000 updated the parameters of the feedback model (e.g., the HM 5006 of FIG. 5), subject to the new experience. More specifically, the technique 6000 updates the feedback profile λ and/or the human state transition function τ.

At 6002, the technique 6000 can detect a state s of the world around a vehicle, such as the vehicle 7004 of FIG. 7. The state s is a state of a domain model (e.g., the DM 5004 of FIG. 5). The state s can be detected using sensors of the vehicle, such as one or more of the sensor 1360 of FIG. 1

At 6004, the detected state s can be used to select a policy π. As described above, the policy π can be restricted by an autonomy profile κ, which can include one or more constraints. For example, if the autonomy level that the ACA selected is not in the autonomy profile κ, then the ACA can replan to select a new action and a new autonomy level that are allowed by the autonomy profile.

A corresponding competence probability can be associated with each autonomy level. That is, a competence probability can be associated with taking an action in a particular state.

For example, a 10% competence probability associated with selecting to perform an action (e.g., "go") autonomously (i.e., in "unsupervised-autonomy") in a particular state can mean that there is a 10% chance that autonomously performing the action in the particular state in the correct autonomy level. As such, there can be a 0.1 probability that a big penalty may be incurred if the action is performed autonomously but the resulting state is a bad state. Conversely, there may be a 0.9 probability that I was actually correct in my level of the competence. And so I successfully, you know, complete a maneuver for the AV. So the competence gets baked in to the state's transition—the probability of going from s at time T to s at time T+1; and so knowing that that's baked in there, when we look at the rewards over time, the system will autonomously choose . . . it will lay all the calculations like an Actuarial Sciences would of like risk. It basically does a huge risk assessment with all of these probabilities over time and determines at what points it should be autonomous and when it should ask for help and when should it ask for approval.

The competence probabilities can be considered (e.g., used, etc.) in computing the policy π. The competence probabilities can be factored in the state transitions from a first state $s_1$ at time T to a second state $s_2$ at time T+1.

A corresponding cost can be associated with the selected autonomy level. In an example, the costs (e.g., rewards) can be in units of time. However, other units of measure can be used. Asking for help from a human takes a long of time as, for example, a tele-operator needs to first gain a situational awareness of the situation, analyze the situation, take control the AV, and actually control the AV to perform an action. Such an interaction may take, for example, 60 seconds, which can be considered to be a huge cost. Whereas in the case of autonomy level $l_3$ (i.e., "unsupervised autonomy"), no delay is incurred. As such the costs in terms of time or some other unit of picking different autonomy levels of involving the human at different amounts to different degrees can be considered (e.g., used, etc.) in computing the policy π.

At 6006, the technique 600 can output an action a and a level of autonomy l. Thus, at 6004, a tuple (a, l) can be output. The level of autonomy l dictates the manner in which the ACA of the vehicle 7004 goes about carrying out the action a. Examples of interpreting the tuple (a, l) include "the ACA selects a stop action; but the ACA will ask for help with whether stop is the right action," or "the ACA selected a go action and will go because the ACA is fully competent."

If the level of autonomy is $l_0$ (i.e., "no autonomy"), the technique 6000 proceeds to 6014. For example, a human operator can remotely control the vehicle 7004 or can send commands to the vehicle 7004 to perform actions. After the manual operation at 6014 is completed, the technique 6000 proceeds to 6016.

If the level of autonomy is $l_1$ (i.e., "verified autonomy"), the technique 6000 proceeds to 6008. In a simple example, the ACA of the vehicle 7004 may determine that since the view is obstructed by the vehicle 7010, the action it should take is to "edge" forward toward the middle of the intersection 7002. However, before completing the action, the vehicle 7004 can forward the action to the human (e.g., the tele-operator) for approval. The tele-operator can send a feedback signal (and the ACA can receive the feedback signal) of "disapprove," which causes the level of autonomy to be switched to "no autonomy," at 6014. The ACA can receive a feedback signal of "approval." In the case of a feedback signal of "approval," the technique 6000 proceeds to 6010 to perform the selection action.

If the level of autonomy is $l_2$ (i.e., "supervised autonomy"), the technique 6000 proceeds to 6010. At 6010, before attempting the selected action, the ACA of the vehicle 7004 can ensure that a tele-operator is monitoring the vehicle 7004 while the action is being performed. While the ACA is performing the selected action, the ACA can complete the action without receiving any feedback, at 6012, from the human. As such, after the action is completed, the technique 6000 proceeds to 6016. On the other hand, while the action is being performed, the ACA can receive an override feedback signal, which causes the level of autonomy to transition to the "no autonomy" level, at 6014.

If the level of autonomy is $l_3$ (i.e., "unsupervised autonomy"), the action is performed autonomously by the vehicle 5004 and the technique 6000 proceeds to 6016.

At 6016, the technique 6000 updates the feedback profile, λ, and the human state transition function, τ based on the feedback, which may be received feedback or no feedback.

How the feedback profile, λ, is updated can depend on the classifier that is being used. However, in general, the feedback profile, λ, can be updated by augmenting the dataset of received human feedback signals and retraining the classifier (the decision maker) on the new data.

The human state transition function, τ, can be updated when a human takes over control, by observing what new state the ACA ends up in, and, in general, taking a maximum a posteriori estimate. In practice, this may be done by simply counting the frequency of every state the ACA ended up in when it was in some states and intended or attempted to take action a, but the human took over control.

The models can be updated using model-free reinforcement learning, model-based reinforcement learning, or some other learning technique. In model-free reinforcement learning, probability values can be adjusted up or down. In model-based reinforcement learning, probability values can be calculated based on counts of successfully reaching a goal state in a scenario as compared to all the times that the scenario was encountered.

In an example of reinforcement learning, estimates for how much time (e.g., costs) it takes ACA to reach its goal state (e.g., to get through an intersection) are maintained. Such times can be maintained with the different autonomy levels. In a case where the goal state is not reached (e.g., the intersection is not crossed), human assistance was requested, the human assisted or overruled the ACA, or the like, the probabilities can be adjusted downward. In the case of "unsupervised autonomy" or "no feedback, the probabilities can be adjusted upward. That is, the probabilities can be constantly adjusted up and down for all the different combinations of states.

In some implementation, from 6016, the technique 6000 can proceed to 6018; in other implementations, the technique 6000 proceeds back to 6002. That is, the block 6018 can be an optional block.

At 6018, the technique 6000 can engage in gated exploration (GE).

As mentioned above, a fundamental component of the CAS is that the system can use what it has learned to adjust the autonomy profile, κ, over time to optimize its autonomy by reducing unnecessary reliance on humans. However, before operating in a new level of autonomy, the ACA may have no knowledge of how the human will interact with ACA in that level of autonomy. Thus, the feedback profile in the new level of autonomy may be uniformly random as it has received no data. As a result, it is necessary that the CAS 'explore' levels of autonomy that the CAS has reason to believe may be more cost effective than its current level. As such, the CAS may generate the data it needs to improve the accuracy and confidence of its feedback profile in those levels.

However, any sort of random or pseudo-random exploration (e.g., random exploration, E-greedy exploration) can lead to frequent failures, which, in the real world, can have severe consequences (e.g., collisions, causing traffic jams, etc.). To this end a simple extension to traditional exploration methods, referred to herein as gated exploration can be used.

In gated exploration, the CAS can still follow a random or a pseudo-random exploration policy for attempting to act in levels of autonomy disallowed by the autonomy profile κ. When this happens, instead of simply executing the action, the ACA can first request that the human allow the ACA to alter the autonomy profile κ so that the autonomy level that the ACA wants to attempt is now allowed.

In reinforcement learning literature, where the domain is not known, an agent must tradeoff between either exploiting the information it has and simply taking the action that has performed the best in the past, or exploring new actions and new states (or ones that were simply suboptimal in the past) which may turn out to be better.

This concept is leveraged herein. In the model described herein, the optimal level of autonomy is assumed to not be known a priori, else the ACA would have simply been designed to perform at said level. Hence the ACA must, over time, learn what that optimal level is. However, because the ACA is also operating in the real world while it learns, the ACA must make this same tradeoff. That is, the ACA must operate at the current optimal level of autonomy given the history of human feedback signals it has received, or try a new, possibly higher level of autonomy for which it has no or limited feedback signals. This is the 'exploration' part of the gated exploration (GE).

However, it would defeat the purpose of the model described herein to allow the ACA to operate at levels of autonomy that the ACA is not allowed to operate at simply to try and see if it is better. Hence, when the ACA desires to change the highest level of autonomy it can operate at, it must first query the human to change its allowed levels of autonomy. This is the 'gated' part of gated exploration (GE).

It is worth noting that although, in general, it is expected that the ACA is exploring higher levels of autonomy, assuming a conservative initial model, this is not a requirement, and indeed the agent can explore downwards. That is, the ACA can query a human to actually decrease the highest level of autonomy it can act in for some situations. Doing so would force the ACA to act in a level of autonomy that the ACA, in general, otherwise would not, allowing it to get more data in that level and improve the quality of its model.

From 6018, the technique 6000 proceeds back 6002 to repeat the above described operations whereby the technique 6000 detects the current state of the world, selects an action to execute and an autonomy level, and so on.

Figure 8:
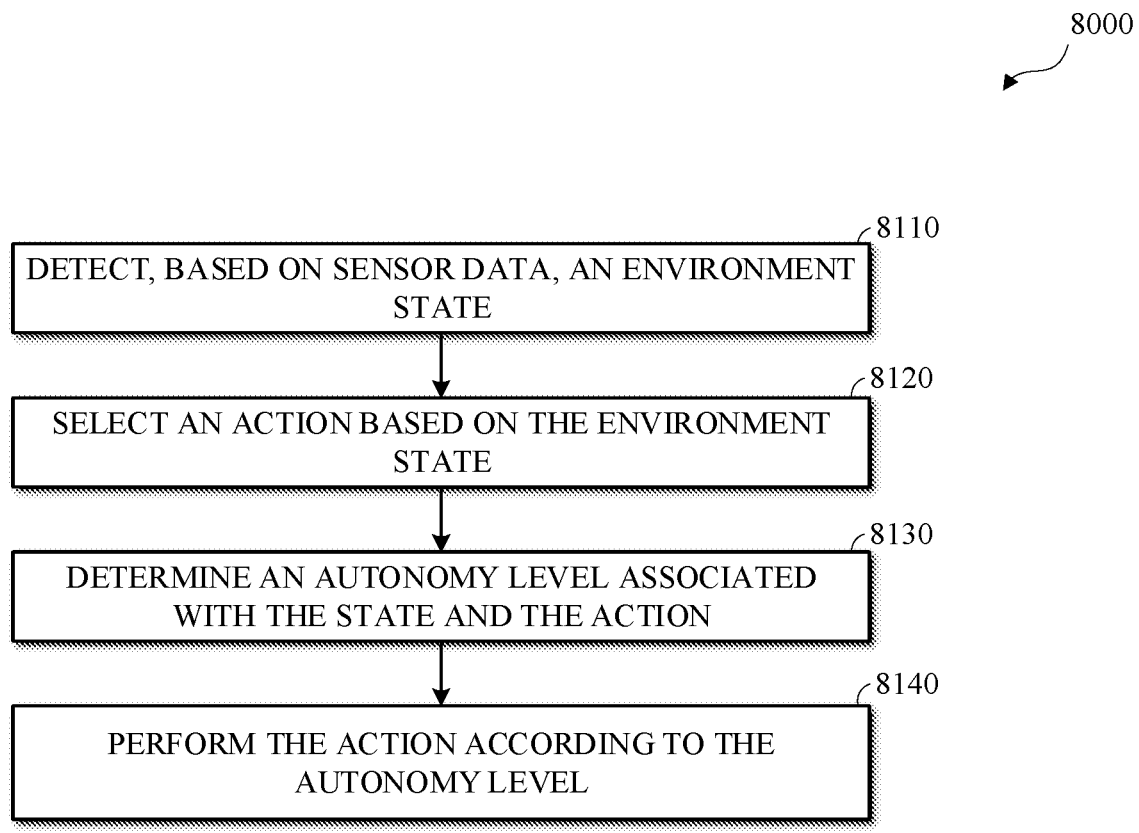
FIG. 8 is a flow chart diagram of an example of a technique for autonomous driving by an autonomous vehicle (AV) in accordance with embodiments of this disclosure.

FIG. 8 is a flow chart diagram of an example of a technique 8000 for autonomous driving by an autonomous vehicle (AV) in accordance with embodiments of this disclosure. The technique 8000 of FIG. 8 can be implemented by competence-aware system or an autonomy cognizant agent of FIG. 5. The technique 8000 can be implemented in the AV, which can be the vehicle 1000 shown in FIG. 1, one of the vehicles 2100/2110 shown in FIG. 2, a semi-autonomous vehicle, or any other vehicle implementing autonomous driving.

At 8110, the technique 8000 detects, based on sensor data, an environment state. In an example, the environment state can be a factored state, as described above with respect to the extended SSP problem. In an example, the state can be a state s of the set of states S. The state can be detected as described with respect to 6002 of FIG. 6

At 8120, the technique 8000 selects an action based on the environment state. The action can be selected as described with respect to 6006 of FIG. 6.

At 8130, the technique 8000 determines an autonomy level associated with the environment state and the action. The autonomy level can be selected based at least on an autonomy model and a feedback model, as described with respect to 6004 of FIG. 6. The autonomy model can be as described with respect to the AM 5008 of FIG. 5. As such, in an example, the autonomy model can include a utility model and an autonomy profile. The utility model can describe a utility of performing a first action in a first autonomy level with respect to a first environment state given that the AV just operated in second autonomy level. The autonomy profile can map respective environment states to respective actions and can prescribe constraints on allowed levels of autonomy for particular environment states. The feedback model can be as described with respect to the HM 5006 of FIG. 5.

In an example, the autonomy level can be selected from a set of autonomy levels that includes a first autonomy level indicating "no autonomy," a second autonomy level indicating "verified autonomy," a third autonomy level indicating "supervised autonomy," and a fourth autonomy level indicating "unsupervised autonomy."

At 8140, the technique 8000 performs the action according to the autonomy level.

In an example of 8140, the autonomy level can be the second autonomy level indicating "verified autonomy and performing the action according to the autonomy level can include receiving, for the action, an approval feedback signal or a disapproval feedback signal. The feedback signal can be received from a human. In an example, the human can be an in-vehicle human. In an example, the human can be a tele-operator. In an example, performing the action according to the autonomy level can include querying for the approval feedback signal prior to receiving the approval feedback signal.

In an example of 8140, the autonomy level can be the third autonomy level indicating "supervised autonomy," and performing the action according to the autonomy level can include determining that the AV is being monitored by a human before performing the action. For example, the technique 8000 can receive a signal from the human indicating that the human is monitoring the AV.

In an example of 8140, and as described with respect to FIG. 6, the approval feedback signal can be received and performing the action according to the autonomy level can include determining that the AV is being monitored; in response to determining that the AV is being monitored, performing the action; receiving an override signal; and in response to receiving the override signal, stopping the action and switching to a manual operation mode of the AV.

In an example of 8140, performing the action according to the autonomy level can include determining, based on the autonomy level, whether to request approval from a human for the action before performing the action.

In an example, the autonomy level can be an "no autonomy" such that the AV is not allowed to perform autonomous actions and performing the action according to the autonomy level can include enabling the AV to be manually controlled by a human, as described with respect to 6014 of FIG. 6.

In an example, the technique 8000 can include updating at least one of an autonomy profile, a feedback profile, or a human transition function in response to the performing the action. Updating each of the autonomy profile, the feedback profile, or the human transition function for the AV can be based on the feedback signals that the AV itself receives. However, the updating can be based on the feedback signals that many AVs (such as AVs in a fleet) receive. For example, all signals sent to the AVs can be aggregated at some central location, the model(s) updated, and the updated models redistributed to the AVs. However, other ways of updating the models based on feedback signals received by (i.e., sent to) multiple AVs are possible.

As described above, an aspect of the disclosed implementation can include a system that includes a memory, such as the memory 1340 of FIG. 1, and a processor, such as the processor 1330 of FIG. 1. The memory can include instructions which can be executed by the processor to calculate, by solving an extended Stochastic Shortest Path (SSP) problem, a policy for solving a task, as described above with respect to the extended SSP problem. The policy can map environment states and autonomy levels to actions and autonomy levels. Calculating the policy can include generating plans that operate across multiple levels of autonomy.

In an example, generating plans that operate across the multiple levels of autonomy can include generating plans subject to constraints on allowed levels of autonomy in respective states, as described above with respect to the autonomy profile κ.

In an example, the instructions can include instructions to update a feedback profile. The feedback profile can represent a first probability that the system receives a first signal when performing a first action at a second autonomy level given that the system is in a first state and the system just operated in a first autonomy level.

In an example, the instructions can include instructions to update a human state transition function. The human state transition function can represent a second probability of a human transitioning to a second state of an environment model given that the system selected to perform a second action in a first state and the human took manual control.

In an example, the instructions can include instructions to update an autonomy profile. The autonomy profile can define a set of acceptable autonomy levels given a current state and an action to be performed next.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of autonomous driving by an autonomous vehicle (AV), comprising:
   detecting, based on sensor data, an environment state;
   selecting an action based on the environment state;
   determining an autonomy level associated with the environment state and the action,
   wherein the autonomy level indicates an extent to which the action is to be performed autonomously by the AV, wherein the AV determines respective autonomy levels for actions to be performed,
wherein the autonomy level is selected based at least on an autonomy model and a feedback model, and
wherein the feedback model models feedback types received from a human with respect to the action, how costly each type of feedback is, and how likely is each type of feedback to be received from the human; and
performing the action according to the autonomy level, wherein performing the action according to the autonomy level comprises:
in response to determining that the autonomy level indicates "verified autonomy" and to determining that the AV is being monitored:
performing the action; and
in response to receiving an override signal while the action is being performed, stopping the action and switching to a manual operation mode of the AV.

2. The method of claim 1, wherein the autonomy level is selected from a set comprising a first autonomy level indicating "no autonomy", a second autonomy level indicating "verified autonomy", a third autonomy level indicating "supervised autonomy", and a fourth autonomy level indicating "unsupervised autonomy".

3. The method of claim 2,
wherein the autonomy level is the second autonomy level indicating "verified autonomy", and wherein performing the action according to the autonomy level comprises:
receiving, for the action, an approval feedback signal or a disapproval feedback signal.

4. The method of claim 3, wherein performing the action according to the autonomy level comprises:
querying for the approval feedback signal prior to receiving the approval feedback signal.

5. The method of claim 3,
wherein the autonomy level is the third autonomy level indicating "supervised autonomy", and
wherein performing the action according to the autonomy level comprises:
determining that the AV is being monitored by a human before performing the action.

6. The method of claim 3, further comprising:
receiving the approval feedback signal.

7. The method of claim 1, wherein performing the action according to the autonomy level comprises:
determining, based on the autonomy level, whether to request approval from a human for the action before performing the action.

8. The method of claim 1,
wherein the autonomy level is an "no autonomy" such that the AV is not allowed to perform autonomous actions, and
wherein performing the action according to the autonomy level comprises:
enabling the AV to be manually controlled by a human.

9. The method of claim 1,
wherein the autonomy model comprises a utility model and an autonomy profile,
wherein utility model describes a utility of performing a first action in a first autonomy level with respect to a first environment state given that the AV just operated in second autonomy level, and
wherein the autonomy profile maps respective environment states to respective actions and prescribing constraints on allowed levels of autonomy for particular environment states.

10. The method of claim 1, further comprising:
updating at least one of an autonomy profile, a feedback profile, or a human transition function in response to the performing the action.

11. An autonomous vehicle (AV), comprising:
a processor configured to execute instructions to:
detect, based on sensor data, an environment state;
select an action based on the environment state;
determine an autonomy level associated with the environment state and the action,
wherein the autonomy level indicates an extent to which the action is to be performed autonomously,
wherein the AV determines respective autonomy levels for actions to be performed,
wherein the autonomy level is selected based at least on an autonomy model and a feedback model, and
wherein the feedback model models feedback types received from a human with respect to the action, how costly each type of feedback is, and how likely is each type of feedback to be received from the human; and
cause the action to be performed according to the autonomy level, wherein to cause the action to be performed according to the autonomy level comprises to:
in response to determining that the autonomy level indicates "verified autonomy" and to determining that the AV is being monitored,
cause the action to be performed; and
in response to receiving an override signal while the action is being performed, cause the action to stop and cause a switch to a manual operation mode of the AV.

12. The AV of claim 11, wherein the autonomy level is selected from a set comprising a first autonomy level indicating "no autonomy", a second autonomy level indicating "verified autonomy", a third autonomy level indicating "supervised autonomy", and a fourth autonomy level indicating "unsupervised autonomy".

13. The AV of claim 12,
wherein the autonomy level is the second autonomy level indicating "verified autonomy", and wherein to perform the action according to the autonomy level comprises to:
receive, for the action, an approval feedback signal or a disapproval feedback signal.

14. The AV of claim 13, wherein to perform the action according to the autonomy level comprises to:
query for the approval feedback signal prior to receiving the approval feedback signal.

15. The AV of claim 13,
wherein the autonomy level is the third autonomy level indicating "supervised autonomy", and
wherein to performing the action according to the autonomy level comprises to:
determine that the AV is being monitored by a human before performing the action.

16. The AV of claim 13, wherein the processor is further configured to execute instructions to:
receive the approval feedback signal.

17. The AV of claim 11, wherein to perform the action according to the autonomy level comprises to:

determine, based on the autonomy level, whether to request approval from a human for the action before performing the action.

18. The AV of claim 11,
wherein the autonomy level is an "no autonomy" such that the AV is not allowed to perform autonomous actions, and
wherein to perform the action according to the autonomy level comprises to:
enable the AV to be manually controlled by a human.

19. The AV of claim 11,
wherein the autonomy model comprises a utility model and an autonomy profile,
wherein utility model describes a utility of performing a first action in a first autonomy level with respect to a first environment state given that the AV just operated in second autonomy level, and
wherein the autonomy profile maps respective environment states to respective actions and prescribing constraints on allowed levels of autonomy for particular environment states.

20. The AV of claim 11, wherein the processor is further configured to execute instructions to:
update at least one of an autonomy profile, a feedback profile, or a human transition function in response to performing the action.

* * * * *